(12) United States Patent
Lorenz

(10) Patent No.: US 12,386,435 B2
(45) Date of Patent: Aug. 12, 2025

(54) MULTI-INPUT INTERFACE COMPUTER DEVICE AND METHODS FOR USING THE SAME

(71) Applicant: CODEK FOUNDRIES, INC., Cedar Rapids, IA (US)

(72) Inventor: Philip J. Lorenz, Cedar Rapids, IA (US)

(73) Assignee: CODEK FOUNDRIES, INC., Cedar Rapids, IA (US)

( * ) Notice: Subject to any disclaimer, the term of this patent is extended or adjusted under 35 U.S.C. 154(b) by 0 days.

(21) Appl. No.: 18/212,579

(22) Filed: Jun. 21, 2023

(65) Prior Publication Data

US 2024/0427432 A1    Dec. 26, 2024

(51) Int. Cl.
    *G06F 3/0354*    (2013.01)
(52) U.S. Cl.
    CPC ............................. *G06F 3/03543* (2013.01)
(58) Field of Classification Search
    None
    See application file for complete search history.

(56) References Cited

U.S. PATENT DOCUMENTS

| | | | |
|---|---|---|---|
| 4,835,528 A | 5/1989 | Flinchbaugh | |
| 6,590,563 B1 * | 7/2003 | Oross | G06F 3/039 345/157 |
| 8,054,292 B1 * | 11/2011 | Forde | G06F 3/03543 345/163 |
| 2006/0250353 A1 * | 11/2006 | Yasutake | G06F 3/0383 345/156 |
| 2010/0097309 A1 | 4/2010 | Nishida et al. | |
| 2010/0315335 A1 | 12/2010 | Villar et al. | |
| 2011/0254769 A1 | 10/2011 | Delattre | |
| 2019/0302788 A1 | 10/2019 | Yabushita | |

FOREIGN PATENT DOCUMENTS

EP    2524721 A2    11/2012

OTHER PUBLICATIONS

International Application No. PCT/US2024/026386, International Search Report and Written Opinion, mailed Jul. 26, 2024.

* cited by examiner

*Primary Examiner* — Nicholas J Lee
(74) *Attorney, Agent, or Firm* — MARSHALL, GERSTEIN & BORUN LLP

(57) ABSTRACT

A multi-input interface device includes one or more units. The one or more units include one or more sensor units positioned within a portion of the one or more units and configured to detect a first relative movement of the one or more units. The multi-input interface device includes one or more auxiliary units. The one or more auxiliary units include one or more auxiliary sensor units positioned within a portion of the one or more auxiliary units and configured to detect a second relative movement of the one or more auxiliary units. The one or more units and the one or more auxiliary units are formed as separate units. The one or more units and the one or more auxiliary units are configured to be operated by a user.

19 Claims, 14 Drawing Sheets

MULTI-INPUT INTERFACE COMPUTER DEVICE AND METHODS FOR USING THE SAME

FIELD OF THE DISCLOSURE

The present disclosure is related generally to an interface device for computer systems and other electronic devices.

BACKGROUND

Most computers, e.g., laptop and desktops, receive input from a user via input devices such as a mouse and keyboard. Typically, a mouse allows a user to move the mouse along a surface, and the movement is translated into relative actions on the computer, e.g., move a cursor and select widgets on a graphical user interface (GUI) on a display screen. The mouse typically includes a trackball or optical sensor (located at a bottom side of the mouse) for translating the movement of the mouse into signals used by the computer. The mouse, however, is limited to a single movement input. That is, the user can make one type of movement, (e.g., move the mouse vertically, horizontally, diagonally, etc.) which is translated to movement on the display screen.

The systems and methods disclosed herein provide solutions to these problems and can provide solutions to the ineffectiveness, insecurities, difficulties, inefficiencies, encumbrances and/or other drawbacks of conventional techniques.

SUMMARY

The present aspects can relate to, inter alia, a multi-input interface device operates an input device that enables a user to interface with a computer system or other electronic device in multiple ways, simultaneously, to expand input and increase efficiency of the user interactions.

In one aspect, a multi-input interface device includes one or more units. The one or more units include one or more sensor units positioned within a portion of the one or more units and configured to detect a first relative movement of the one or more units. The multi-input interface device includes one or more auxiliary units. The one or more auxiliary units include one or more auxiliary sensor units positioned within a portion of the one or more auxiliary units and configured to detect a second relative movement of the one or more auxiliary units. The one or more units and the one or more auxiliary units are formed as separate units. The one or more units and the one or more auxiliary units are configured to be operated by a user.

In another aspect, a method for detecting input includes determining an operating mode of a multi-input interface device comprising at least one base unit and at least one auxiliary unit. The operating mode defines input received from the at least one base unit and the at least one auxiliary unit, and the at least one base unit and the at least one auxiliary unit are separate units. The method also includes determining a first input received at the at least one base unit caused by a first interaction of a user with the base unit. Further, the method includes translating the first input into a first operation to be performed by an electronic device. Additionally, the method includes determining a second input receive at the at least one auxiliary unit caused by a second interaction of the user with the auxiliary unit. The method includes translating the second input into a second operation to be performed by the electronic device.

In another aspect, a tangible, non-transitory computer-readable medium stores instructions that, when executed by one or more processors of a computing device, cause the computing device to determine an operating mode of a multi-input interface device comprising at least one base unit and at least one auxiliary unit. The operating mode defines input received from the at least one base unit and the at least one auxiliary unit. The at least one base unit and the at least one auxiliary unit are separate units. The instructions, when executed by one or more processors of a computing device, cause the computing device to determine a base unit input received at the at least one base unit caused by a base unit interaction of a user with the at least one base unit; translate the base unit input into a first operation to be performed by an electronic device; determine an auxiliary unit input receive at the at least one auxiliary unit caused by an auxiliary unit interaction of the user with the at least one auxiliary unit; and translate the auxiliary unit input into a second operation to be performed by the electronic device.

Advantages will become more apparent to those of ordinary skill in the art from the following description of the preferred aspects, which have been shown and described by way of illustration. As will be realized, the present aspects can be capable of other and different aspects, and their details are capable of modification in various respects. Accordingly, the drawings and description are to be regarded as illustrative in nature and not as restrictive.

Figure 1:
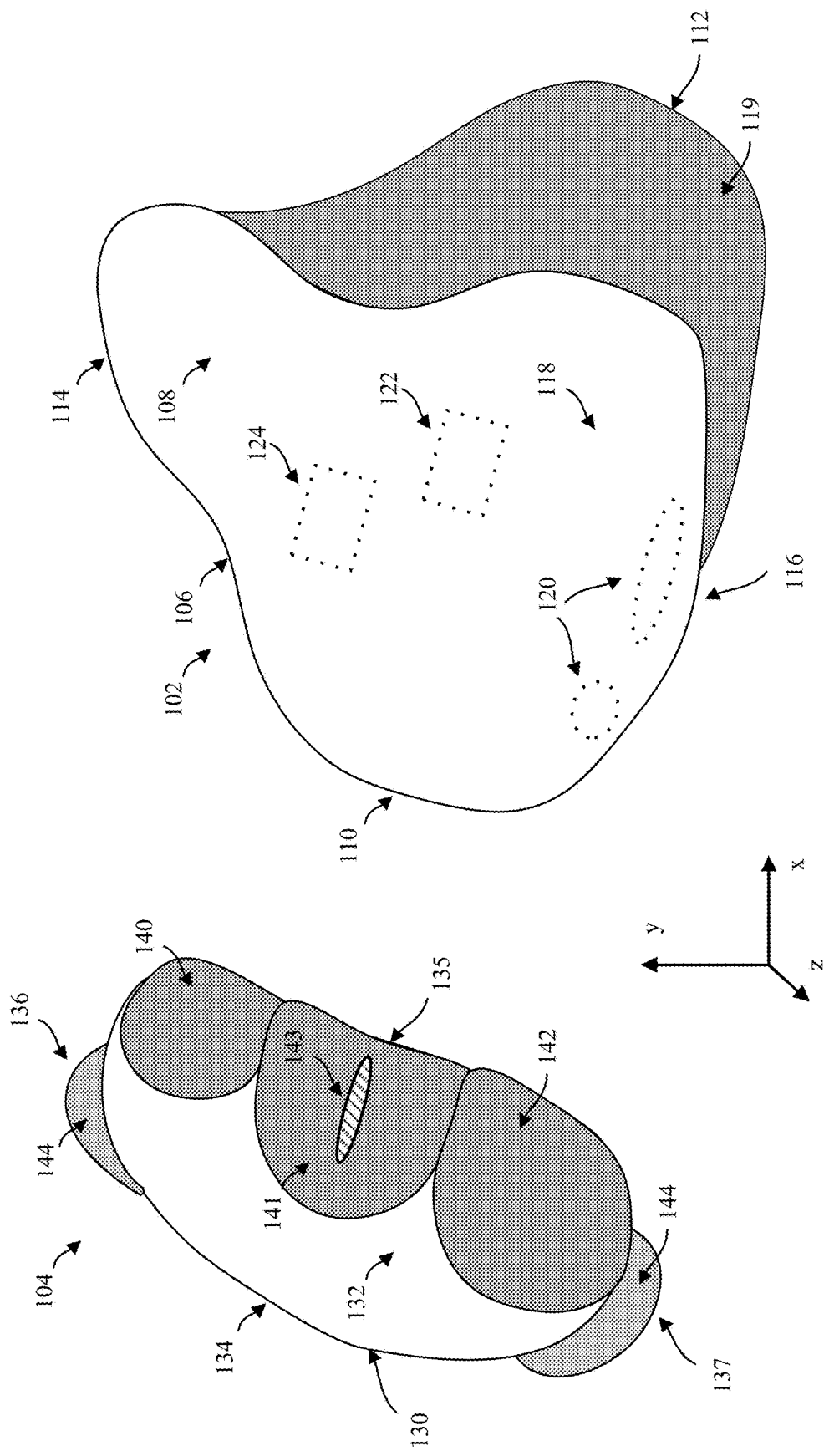
FIG. 1 depicts a top, perspective view of a multi-input interface device according to aspects of the present disclosure.

The figures depict preferred embodiments for purposes of illustration only. One skilled in the art will readily recognize from the following discussion that alternative embodiments of the systems and methods illustrated herein can be employed without departing from the principles described herein.

DETAILED DESCRIPTION

Overall, a multi-input interface device operates an input device that enables a user to interface with a computer system or other electronic device in multiple ways, simultaneously, to expand input and increase efficiency of the user interactions. The interface device can be designed to be used by a human user, for example the hand (left or right) of the human user. The interface device mechanically includes one or more separate units: a base unit and one or more auxiliary units. The base unit and the auxiliary unit are designed to be operated by a user. For example, the base unit and the auxiliary unit can be used by different portions of the hand of the user. In this example, the base unit can be configured as a palm unit, and the one or more auxiliary units can be configured as one or more finger units. The base unit can be constructed to accommodate a size and shape of a human palm. Each of the one or more finger units can be constructed to fit and rest one, two, three or four (or more) fingers of the human hand.

The base unit (e.g., palm unit) includes at least one sensor, e.g., optical sensor, for detecting two-dimensional (2D) or three-dimensional (3D) movement along a surface, e.g., tabletop, and rotation of the base unit. The one or more auxiliary units (e.g., finger pad units) at least one sensor, e.g., optical sensor, for detecting 2D or 3D movement along a surface, e.g., tabletop, and rotation of the auxiliary unit. The multiple sensor data is then evaluated through software algorithms to allow for complex operations on the computer systems or electronic devices. For example, the interface device can allow coarse (e.g., movement of the base unit) and fine manipulation (e.g., auxiliary unit) of information on a display of a computer system (e.g., cursor, targeting sight, CAD manipulation, etc.) The interface device can also allow machine control or interface to vehicles (e.g., drone, robot, etc.) or other intentionally human controlled object.

The base unit (e.g., palm unit) and the one or more auxiliary units (e.g., finger pads), each, include one or more input devices (e.g., buttons, scroll wheels, etc.) for additional input to the computer system or other electronic device. The configuration and operation of the one or more input devices can be configured to provide customizable input and control to the user.

Reference will now be made in detail to the various embodiments and aspects of the present disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as "top," "bottom," "left," "right," "above," "below" and "diagonal," "vertical", "horizontal", and derivatives thereof relate to a cartesian (x, y, z) coordinate system as illustrated in FIGS. 1-5. The term "distal" means away from the center of a body. The term "proximal" means closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the present disclosure in any manner not explicitly set forth.

Figure 2:
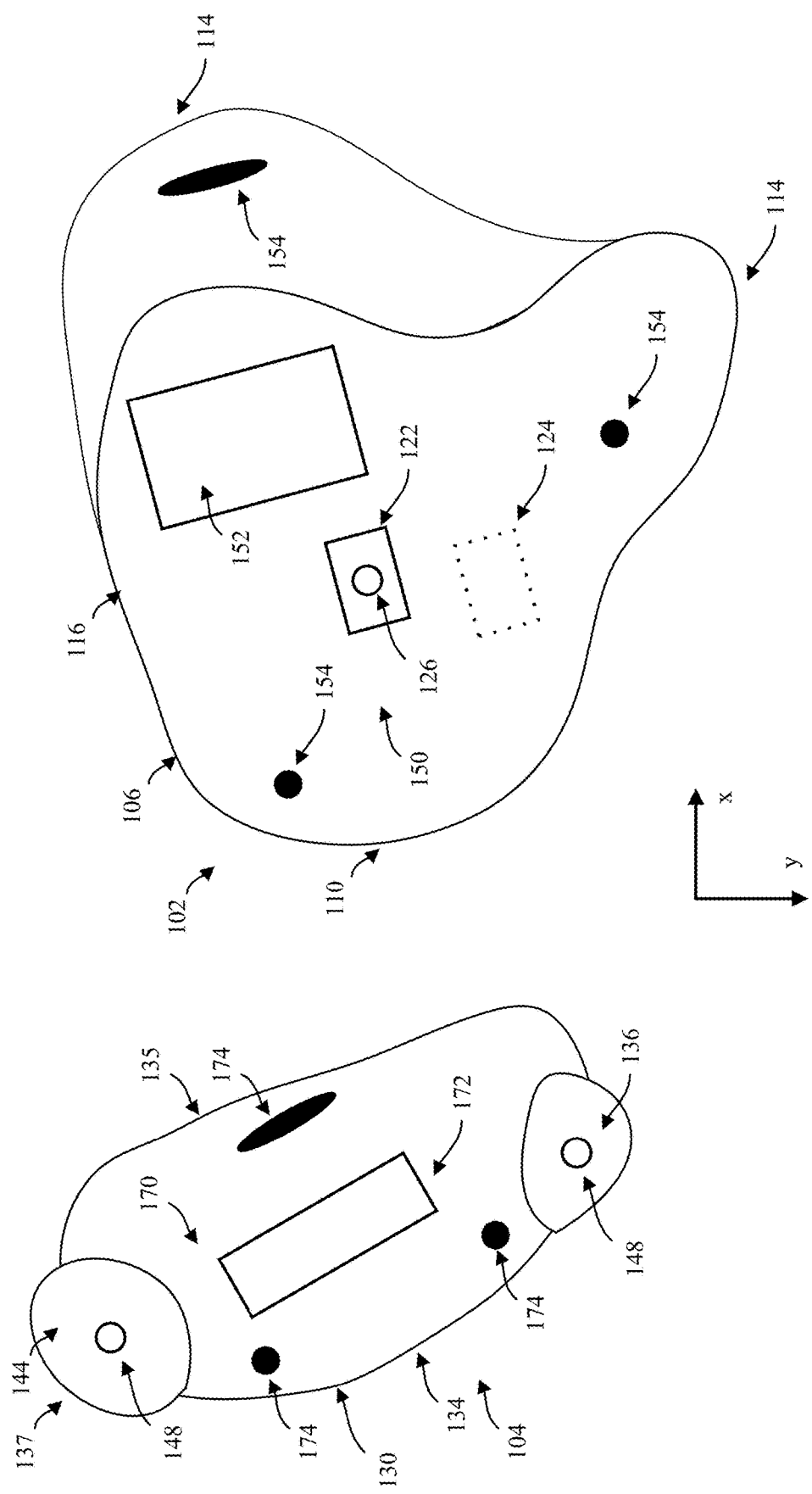
FIG. 2 depicts a bottom, flat view of the multi-input interface device of FIG. 1 according to aspects of the present disclosure.
Figure 3:
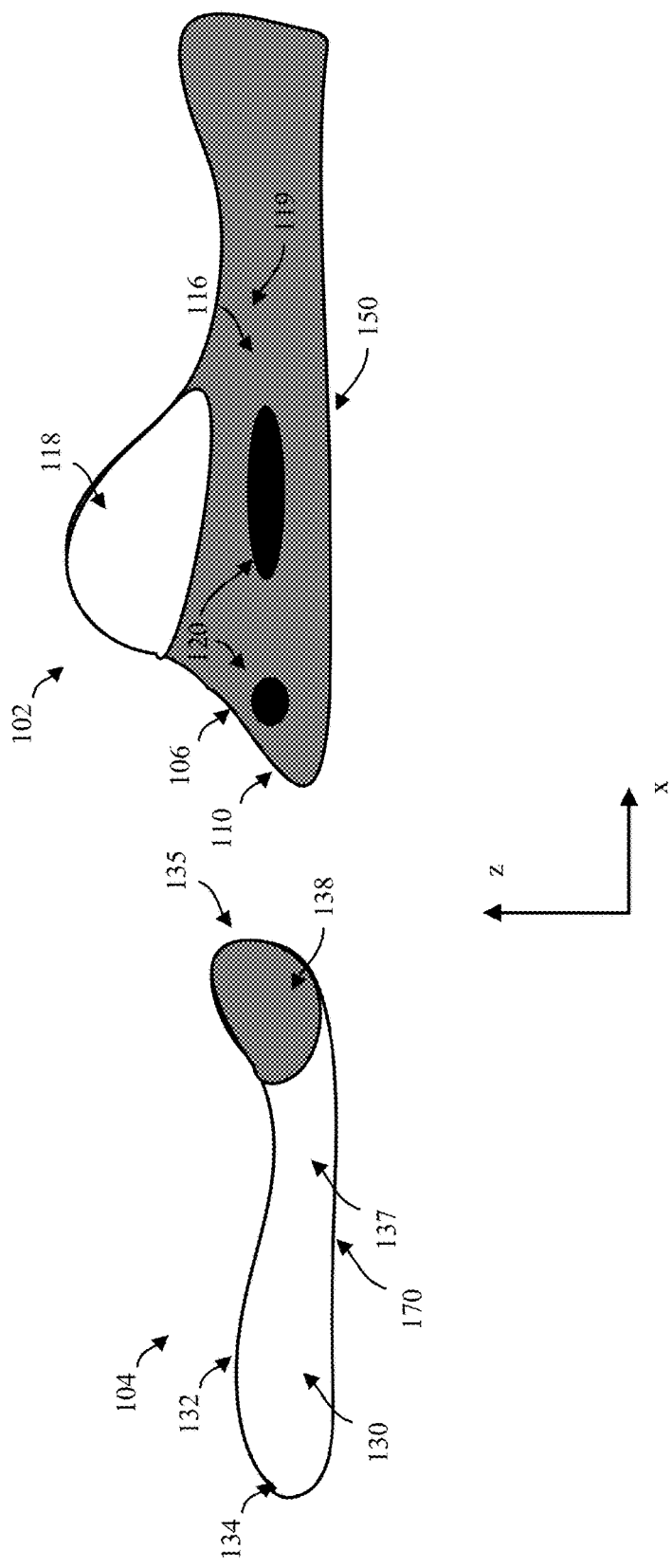
FIG. 3 depicts a side, flat view of the multi-input interface device of FIG. 1 according to aspects of the present disclosure.

FIG. 1 depicts a top, perspective view of an example of an interface device 100 for multi-input control, in accordance with various aspects of the present disclosure. FIG. 2 depicts a bottom, flat view the interface device 100 of FIG. 1, in accordance with various aspects of the present disclosure. FIG. 3 depicts a side, flat view of the interface device 100 of FIG. 1, in accordance with various aspects of the present disclosure. While FIGS. 1, 2, and 3 illustrate various components that can be included in the interface device 100, additional components can be added and components, which are illustrated, can be removed.

As illustrated in FIG. 1, the interface device 100 includes a base unit 102 and one or more auxiliary units 104. As illustrated, in one example, the interface device 100 can include one base unit 102 and one base unit 104. The interface device 100 can also include multiple base units 102 and multiple auxiliary units 104. For example, the interface device 100 can include one base unit 102 and two (2), three (3), etc. auxiliary units 104. While the interface device 100 is describe below with a base unit 102 and 104, the design, construction, and operations described herein are intended to include multiple base units 102 and/or multiple auxiliary units 104.

The base unit 102 and the auxiliary unit 104 are configured to receive input from a user. The input received by the base unit 102 and the auxiliary unit 104 can be received to control operations of one or more electronic devices. For example, the one or more electronic devices can include computer devices and systems (e.g., laptop computers, desktop computers, tablets, smart phones, server computers, thin clients, virtual reality headsets, and the like.) Likewise, the one or more electronic devices can include remotely-operated vehicles (e.g., robotic systems, drones, remotely controlled automobiles, remotely controlled aircraft, and the like).

The base unit 102 and the auxiliary unit 104 can operate as independent units to provide independent input and/or control the one or more electronic devices. The base unit 102 and the auxiliary unit 104 can be moved, independently, on a supporting surface to provide independent input to the one or more electronic devices. For example, 2D or 3D movement of the base unit 102 relative to the supporting surface can be translated to first operations on the one or more electronic devices, and 2D or 3D movement of the auxiliary unit 104 relative to the supporting surface can be translated to second operations on the one or more electronic devices. The movement of the base unit 102 and the auxiliary unit 104 can be simultaneous or the movement of the base unit 102 and the auxiliary unit 104 can be sequential. For instance, movement of the base unit 102 can be translated to course movement of a cursor on a display screen of a computer system, and movement of the auxiliary unit 104 can be translated to fine manipulation the cursor on a display screen of a computer system.

The movement of the base unit 102 and the auxiliary unit 104 can be simultaneous or the movement of the base unit 102 and the auxiliary unit 104 can be sequential. In an embodiment, the simultaneous movement of the base unit 102 and the auxiliary unit 104 can translate to one type of operation on the one or more electronic devices, and the sequential movement of the base unit 102 and the auxiliary unit 104 can translate to another type of operation on the one or more electronic devices.

In embodiments, the base unit 102 is designed to be operated by a user. The base unit 102 includes a base housing 106 having a top surface 108 defined by a front 110, rear 112, right side 114, and left side 116. The base housing 106 can be constructed on any suitable material such as polymeric material (e.g., plastic) and/or composite material. In an example, the top surface 108 of the base unit 102 is sculpted to accommodate a first portion of a human hand and configured to be controlled by the first portion of the human hand. For example, the top surface 108 of the base housing 106 can be sculpted to accommodate a palm and/or thumb of the human hand. For example, as illustrated in FIG. 1 and further in FIG. 3, the top surface 108 of the base housing 106 can include a first sculpted portion 118 and a second sculpted portion 119. The first sculpted portion 118 of the housing can form a rounded, convex protrusion in the top surface 108 of the base housing 106 that is sculpted to accommodate a palm of the human hand. The second sculpted portion 119 can form a concave trench form along the left side 116 of the base housing 106 that is sculpted to accommodate a thumb of the human hand. While the base unit 102 is described herein as being operated by a human hand, the base unit 102 can be operated by any part of a user. Additionally, while the base unit 102 is described herein as being operated by human, the base unit 102 can be operated by any type of entity that can provide input to the base unit 102, e.g., robot.

FIGS. 1 and 3 illustrate the base housing 106 having the second sculpted portion 119 formed on the left side 116 of the base housing 106 thereby accommodating a right hand of a human user. The second sculpted portion 119 can be switched to the right side 114 of the base housing 106 thereby accommodating a left hand of a human user.

The base unit 102 includes one or more input devices, for example, input devices 120. The input devices 120 can be any type of input device that can be actuated by the user of the interface device 100 and/or receive input from the user to provide additional input to the base unit 102. The input devices 120 can detect the actuation by the user using any type of method, for example, mechanical sensing of actuation, electrical sensing of actuation, thermal sensing of actuation, capacitive sensing of actuation, and combination thereof. For example, the input devices 120 can include one or more of a button, a scroll wheel, a toggle, a switch, a joystick, a digital pad, an audio input device (e.g., speaker and/or microphone), a touch pad, and the like. When one or more of the input devices 120 are actuated, a signal is generated that represents the actuation of the input devices 120.

The base unit 102 includes a base sensor unit 122 housed within the base housing 106. The base sensor unit 122 is positioned within the base housing 106. In an embodiment, the base unit 102 can include one base sensor unit 122. In another embodiment, the base unit 102 can include multiple base sensor units 122. In one example, the base sensor unit 122 is positioned within the base housing 106 so that a portion (e.g., window) of the base sensor unit 122 is open on the bottom surface 150 of the base unit 102. The base sensor unit 122 operates to detect the movement of the base unit 102 relative to a reference surface. For example, the base sensor unit 122 can operate to detect the movement of the base unit 102 relative to a support structure, e.g., tabletop or desktop. As illustrated in FIG. 2, the base sensor unit 122 can include one or more base sensors 126. The base sensors 126 are configured to detect and measure translational movement of the base unit 102 in any of the x, y, z plane. The base sensors 126 are configured to detect and measure rotational movement of the base unit 102 about an axis, for example, an axis perpendicular to the bottom surface 150 of the base unit 102. For example, the one or more base sensors 126 can include optical sensors, mechanical sensors, gyroscopic sensors, electro-magnetic induction sensors, accelerometers, thermal sensors, pressure sensors, capacitive sensors, and the like that measure movement (e.g., type of movement, direction of movement, velocity of movement, duration of movement, etc.) of the base unit 102.

In an embodiment, the base sensor unit 122 and sensors 126 can include an infrared (IR) sensor unit. The IR sensor unit operates based on the principle of reflection or interruption of IR radiation. The base sensor unit 122 can include a radiation emitter, for example, an IR light emitting diode (LED) that emits IR radiation in the range of 850 to 950 nanometers. The sensors 126 can include has a sensor that detects IR radiation, for example, a photodiode or other optical sensor. When the base unit 102 is moved on a reference surface, the emitted IR radiation contacts the reference surface, and the IR radiation is either reflected off the reference surface or interrupted if there is a gap or change in the reference surface. The sensor 126 detects the reflected or interrupted IR radiation. The base sensor unit 122 includes hardware and/or software to processes the information received from the sensor 126. The hardware and/or software can calculate movement data (e.g., type of movement, direction of movement, velocity of movement, duration of movement, etc.) representing movement of the base unit 102 based on changes in the reflected or interrupted IR radiation. While the above describes the base sensor unit 122 as an IR sensor, this is one example of a sensor. The base unit sensor 122 can include any type and number of sensors that measure input to the base unit 102.

The base unit 102 includes a base communication unit 124. The base communication unit 124 includes hardware and software to communicate with one or more electronic devices and transmit the input received at the base unit 102 to one or more electronic devices. For example, the base communication unit 124 can transmit the movement data and signals generated by the actuation of the input devices 120 to one or more electronic devices. The base unit 102 can also communicate with the auxiliary unit 104 using the base communication unit 124. In an embodiment, the base communication unit 124 can include a hardwire electrical connection, e.g., universal serial bus (USB) cable, to transmits signals and data. In an embodiment, the base communication unit 124 can include a wireless communication unit for wireless transmitting the signals and data using wireless protocols such as BLUETOOTH, WiFi, or any other radio frequency protocol.

The base unit 102 also includes a base power source housing 152 positioned within the base housing 106. The base power source housing 152 can be a compartment that contains one or more power sources for the base unit 102. Examples of power sources can include batteries, capacitors, and the like. In an embodiment, the base unit 102 can receive power via the base communication unit 124, whether wired or wireless. The base unit 102 can also include one or more anti-friction pads 154 positioned on the bottom surface 150 of the base housing 106. The anti-friction pads 154 can be constructed on any material (e.g., felt) that reduces the friction between bottom surface 150 of the base housing 106 and the reference surface. In an embodiment, the base unit 102 can receive power from an external source, whether wired or wireless.

The auxiliary unit 104 includes an auxiliary housing 130 having a top surface 132 defined by a front 134, a rear 135, a right side 136, and a left side 137. The base housing 106 can be constructed on any suitable material such as polymeric material (e.g., plastic) and/or composite material. In one example, the top surface 132 of the auxiliary housing 130 is configured to be controlled by a second portion of the human hand. For example, the top surface 132 of the auxiliary housing 130 can be controlled by one or more fingers of the human hand. While the auxiliary unit 104 is described herein as being operated by a human hand, the auxiliary unit 104 can be operated by any part of a user. Additionally, while the auxiliary unit 104 is described herein as being operated by human, the auxiliary unit 104 can be operated by any type of entity that can provide input to the auxiliary unit 104, e.g., robot.

The auxiliary unit 104 can include one or more input devices, for example, a first input device 140, a second input device 141, a third input device 142, and a fourth input device 143. The first input device 140, the second input device 141, the third input device 142, and the fourth input device 143 can be any types of input devices that can be actuated by the user of the interface device 100 and/or receive input from a user. The first input device 140, the second input device 141, the third input device 142, and the fourth input device 143 can detect the actuation by the user using any type of method, for example, mechanical sensing of actuation, electrical sensing of actuation, thermal sensing of actuation, capacitive sensing of actuation, and combination thereof. For example, the input devices 120 can include one or more of a button, a scroll wheel, a toggle, a switch, a joystick, a digital pad, an audio input device (e.g., speaker and/or microphone), touch pad, and the like. When one or more of the input devices 120 are actuated, a signal is generated that represents the actuation of the input devices 120.

In one example, one or more portions of the auxiliary housing 130 can be sculpted to accommodate the second portions of the human hand, e.g., human fingers. In an embodiment, the first input device 140, the second input device 141, and/or the third input device 142 can be sculpted to accommodate the second portions of the human hand, e.g., human fingers. For example, the first input device 140, the second input device 141, and/or the third input device 142 can be constructed having a concave indentation relative to the top surface 132 of the auxiliary housing 130. The concave indentation can be open on the rear 135 of the auxiliary housing 130, which is adjacent to the front 110 of the base housing 106. While FIG. 1 illustrates the auxiliary unit 104 as having three input devices that are sculpted, the auxiliary unit 104 can include additional input devices or fewer input devices. Additionally, one or more of the first input device 140, the second input device 141, and/or the third input device 142 can be replaced with a sculpted portion in the top surface 132 of the to accommodate a finger of the human hand, e.g., a concave indentation relative to the top surface 132. While FIG. 1 illustrates one auxiliary unit 104, the interface device 100 can include multiple auxiliary units 104. For example, the interface device 100 can include two (2) auxiliary units 104, three (3) of the auxiliary unit 104, etc. that can be controlled by one or more fingers of a hand of a user.

The auxiliary unit 104 includes an auxiliary sensor unit 144 housed within the auxiliary housing 130. The auxiliary sensor unit 144 is positioned within the auxiliary housing 130. In an embodiment, the auxiliary unit 104 can include one auxiliary sensor unit 144. In another embodiment, the auxiliary unit 104 can include multiple auxiliary sensor unit 144. In one example, the auxiliary sensor unit 144 can be positioned within the auxiliary housing 130 so that a portion (e.g., window) of the auxiliary sensor unit 144 is open on a bottom surface 170 of the auxiliary unit 104. The auxiliary sensor unit 144 operates to detect the movement of the auxiliary unit 104 relative to a reference surface. For example, the auxiliary sensor unit 144 can operate to detect the movement of the auxiliary unit 104 relative to a support structure, e.g., tabletop or desktop. As illustrated in FIG. 2, the auxiliary sensor unit 144 can include one or more auxiliary sensors 148. The auxiliary sensors 148 are configured detect and measure translational movement of the auxiliary unit 104 in any of the x, y, z plane. The auxiliary sensors 148 are configured to detect and measure rotational movement of the auxiliary unit 104 about an axis, for example, an axis perpendicular to the bottom surface 170 of the auxiliary unit 104. For example, the one or more auxiliary sensors 148 can include optical sensors, mechanical sensors, gyroscopic sensors, electro-magnetic induction sensors, accelerometers, thermal sensors, pressure sensors, capacitive sensors, and the like that measure movement (e.g., type of movement, direction of movement, velocity of movement, duration of movement, etc.) of the auxiliary unit 104. In an embodiment, the auxiliary sensor unit 144 and sensors 148 can include an IR sensor unit as described above. While the above describes the one or more auxiliary sensors 148 as an IR sensor, this is one example of a sensor. The auxiliary unit 104 can include any type and number of sensors that measure input to the auxiliary unit 104.

The auxiliary unit 104 includes an auxiliary communication unit 146. The auxiliary communication unit 146 includes hardware and software to communicate with one or more electronic devices and transmit the input received at the auxiliary unit 104 to one or more electronic devices. For example, the auxiliary communication unit 146 can transmit the movement data and signals generated by the actuation of the input devices of the auxiliary unit 104 to one or more electronic devices. The auxiliary unit 104 can also communicate with the base unit 102 using the auxiliary communication unit 146. In an embodiment, the auxiliary communication unit 146 can include a hardwire electrical connection, e.g., USB cable, to transmits signals and data. In an embodiment, the auxiliary communication unit 146 can include a wireless communication unit for wireless transmitting the signals and data using wireless protocols such as BLUETOOTH, WiFi, or any other radio frequency protocol.

The auxiliary unit 104 also includes an auxiliary power source housing 172 positioned within the auxiliary housing 130. The auxiliary power source housing 172 can be a compartment that contains one or more power sources for the auxiliary unit 104. Examples of power sources can include batteries, capacitors, and the like. In an embodiment, the auxiliary unit 104 can receive power via the auxiliary communication unit 146, whether wired or wireless. The auxiliary unit 104 can also include one or more anti-friction pads 174 positioned on the bottom surface 170 of the auxiliary housing 130. The anti-friction pads 174 can be constructed on any material (e.g., felt) that reduces the friction between bottom surface 170 of the auxiliary housing 130 and the reference surface. In an embodiment, the base unit 102 can receive power from an external source, whether wired or wireless.

In embodiments and examples described herein, the interface device 100, e.g., the base unit 102 and auxiliary unit 104 can be constructed to any dimensions and specifications as required by the intended user of the interface device. For example, the base unit 102 and auxiliary unit 104 can be constructed to dimensions and specifications that enable the base unit 102 and auxiliary unit 104 to used operated by a hand of a user, e.g., human hand. In other examples, the base unit 102 and auxiliary unit 104 can be constructed to dimensions and specifications that enable the base unit 102 and auxiliary unit 104 to used operated by other parts of a user, e.g., elbow, head, food, etc.

Figure 4:
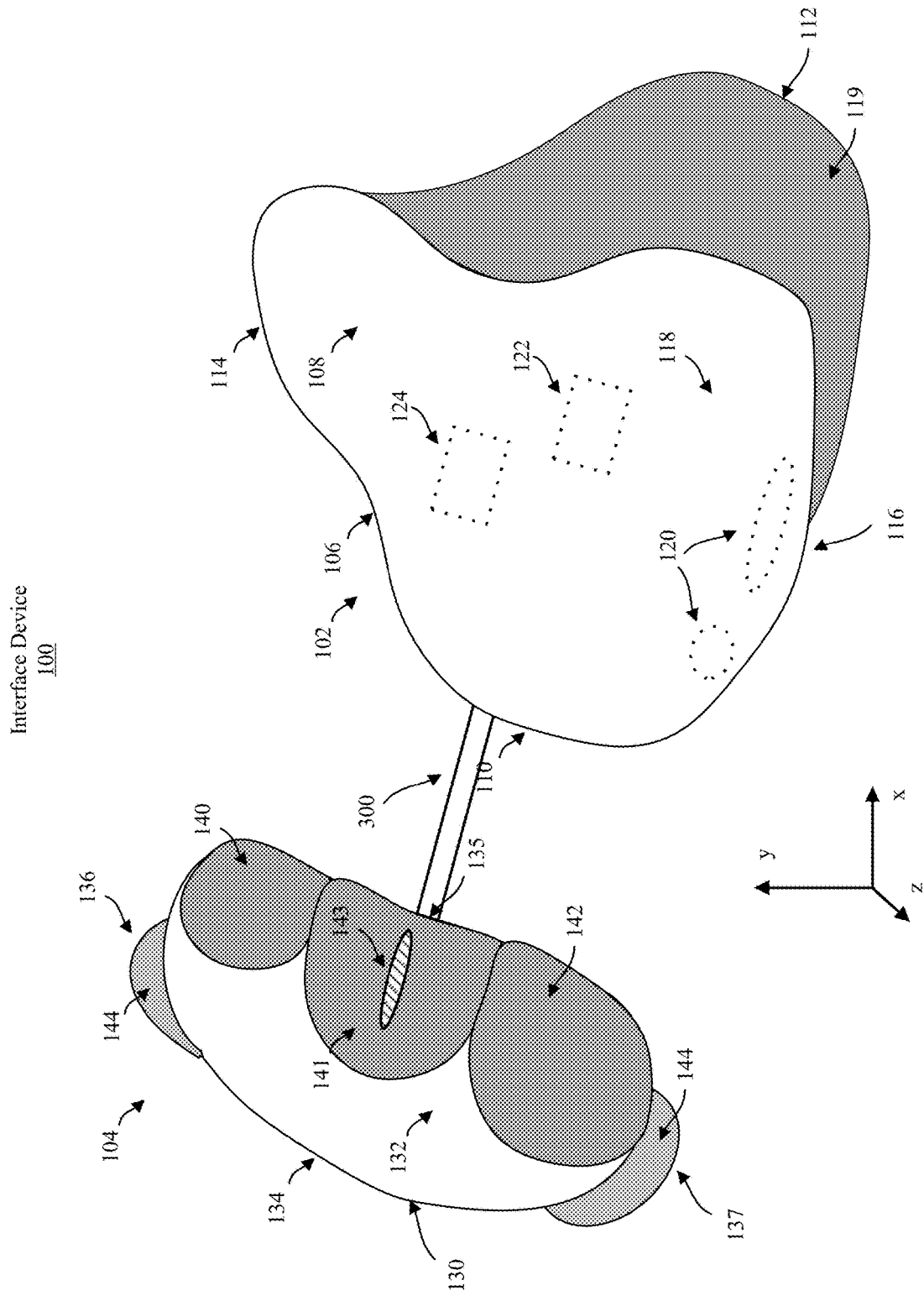
FIG. 4 depicts a top, perspective view of another multi-input interface device according to aspects of the present disclosure.
Figure 5:
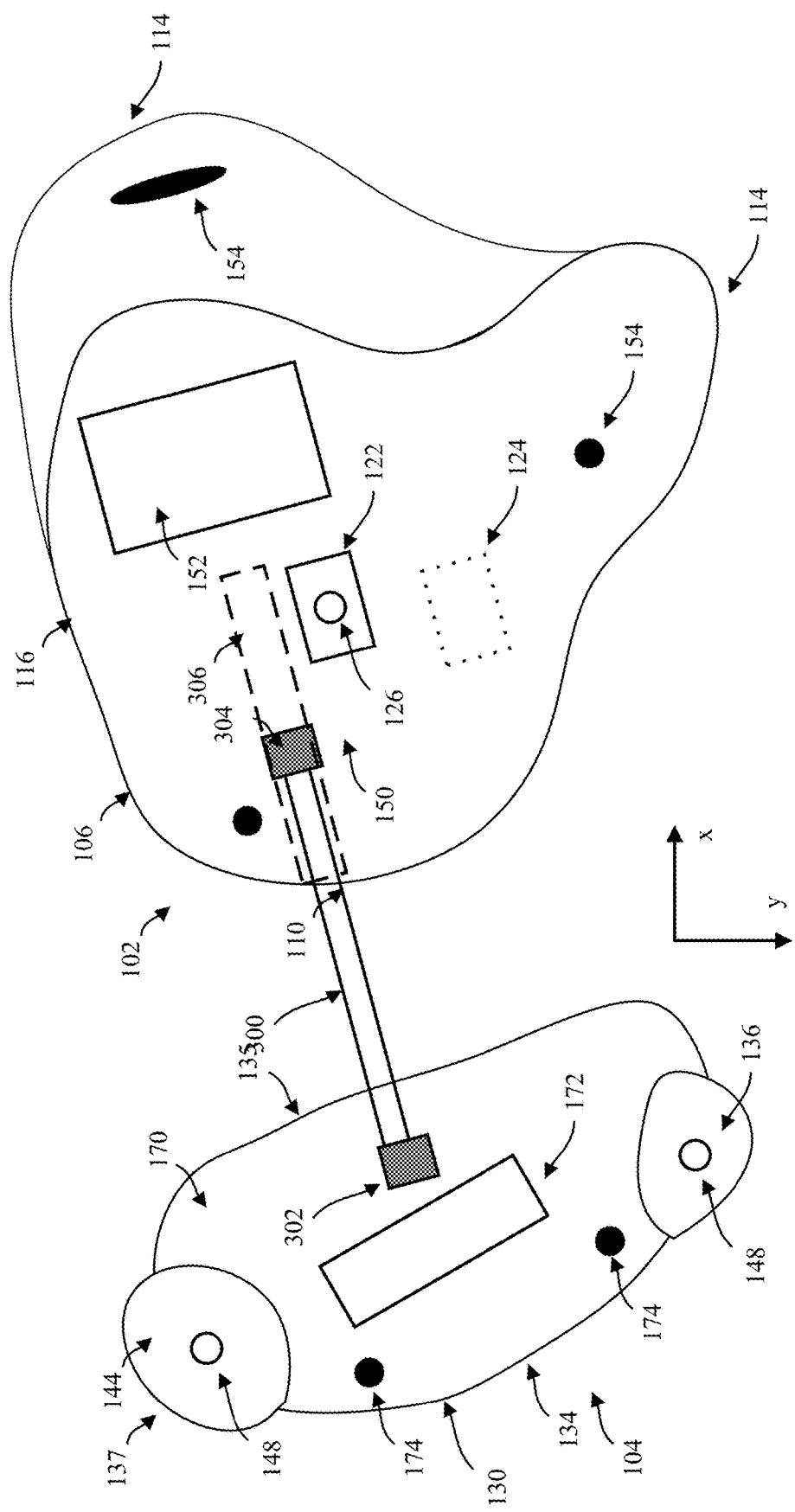
FIG. 5 depicts a top, perspective view of the multi-input interface device of FIG. 4 according to aspects of the present disclosure.

FIG. 4 depicts a top, perspective view of another example of the interface device 100 for multi-input control, in accordance with various aspects of the present disclosure. FIG. 3 depicts a bottom, flat view of the interface device 100 of FIG. 4, in accordance with various aspects of the present disclosure. While FIGS. 4 and 5 illustrate various components that can be included in the interface device 100, additional components can be added and components, which are illustrated, can be removed.

As illustrated in FIG. 4, the interface device 100 includes a connector bar 300. The connector bar 300 couples the base unit 102 to the auxiliary unit 104. The connector bar 300 can be constructed of any type of material such as metal, metal alloy, a polymeric material (e.g., plastic) or composite material. In an embodiment, the connector bar 300 can be constructed having a rectangular bar shape. While the connector bar 300 is described as a having a "bar" shape, the connector bar 300 can be constructed as having any type of other shape, for example, a rod shape. Additionally, while FIG. 4 illustrates the interface device 100 as having a single connector bar 300, the interface device 100 can include multiple connector bars 300 that couple the base unit 102 to the auxiliary unit 104.

In an embodiment, the connector bar 300 enables the base unit 102 to the auxiliary unit 104 to operate as a single unit. That is, the connector bar 300 provides a rigid connection between the base unit 102 to the auxiliary unit 104 so that, if the base unit 102 is moved, the auxiliary unit 104 correspondingly moves and vice versa. When coupled by the connector bar 300, the interface device 100 can operate in an absolute mode. The absolute mode allows the interface device 100 to operate as a single unit, similar to a computer mouse, with the additional input devices, the first input device 140, the second input device 141, the third input device 142, and the fourth input device 143, of the auxiliary unit 104. In the absolute mode, the interface device 100 can determine the movement data using the base sensor unit 122 and/or the auxiliary sensor unit 144.

In an embodiment, the connector bar 300 enables the base unit 102 to the auxiliary unit 104 to operate in combination to provided additional input. That is, the connector bar 300 provides a semi-rigid and/or elastic connection between the base unit 102 to the auxiliary unit 104 so that the base unit 102 to the auxiliary unit 104 can be independently within limits based on the rigidity and/or elasticity of the connector bar 300. Additionally, the resistance and elasticity provided by the connector bar 300 can operate as additional input to the interface unit 100. For example, the connector bar 300 can be constructed of a semi-rigid, elastic material, e.g., spring material, that provides resistance when the base unit 102 to the auxiliary unit 104 are moved relative to one another. The semi-rigid, elastic material of the connector bar 300 can also provide a return force, e.g., when a force is applied to the base unit 102 to the auxiliary unit 104 and then removed, the base unit 102 and the auxiliary unit 104 can return to an initial position based on the elasticity of the connector bar 300.

When coupled by the connector bar 300 having semi-rigid and/or elastic properties, the interface device 100 can operate in a return-to-center mode. The return-to-center mode allows the resistance and elasticity provided by the connector bar 300 to operate as additional input to the interface unit 100. For example, when a force is applied to the base unit 102 to the auxiliary unit 104 and then removed, the base unit 102 and the auxiliary unit 104 can return to an initial position based on the elasticity of the connector bar 300. The return to the initial position of the base unit 102 and the auxiliary unit 104 relative to one another can correspond to an input to an electronic device. For example, this return can cause a cursor on a display device to return to a center of the display device.

When coupled by the connector bar 300 having semi-rigid and/or elastic properties, the interface device 100 can operate in a resistive mode. The resistive mode allows the resistance and elasticity provided by the connector bar 300 to operate as additional input to the interface unit 100. For example, the base unit 102 and/or the auxiliary unit 104 can include one or more sensors that measure the force applied to the connector bar 300, the deformation of the connector bar 300, and the like. These measurements can be translated into input on an electronic device.

As illustrated in FIG. 5, the connector bar 300 can be coupled to the auxiliary unit 104 by an auxiliary connector 302. The auxiliary connector 302 can allow the connector bar 300 to be attached and removed from the auxiliary unit 104. The connector bar 300 can be coupled to the base unit 102 by a base connector 304. The base connector 304 can allow the connector bar 300 to be attached and removed from the base unit 102. The auxiliary connector 302 and/or base connector 304 can include one or more sensors that detect when the connector bar is coupled to the auxiliary connector 302 and the base connector 304. For example, the one or more sensors can include a mechanical, electrical, and/or electro-mechanical switch or latch that actuates when the connector bar is coupled to the auxiliary connector 302 and/or base connector 304. The one or more sensors can provide a signal that is used to place the interface device 100 in different modes, e.g., absolute mode, return-to-center mode, and/or resistance mode.

In an embodiment, the base unit 102 can include a bar storage 306 formed in the base housing 106. The bar storage 306 can receive and store the connector bar 300 when not in use to connect the base unit 102 and the auxiliary unit 104. For example, the bar storage 306 can be constructed as a cavity within the base housing 106. In another example, the bar storage 306 can be constructed as a trench that holds the connector bar 300 flush with or recessed from the bottom surface 150 of the base housing 106.

Figure 6:
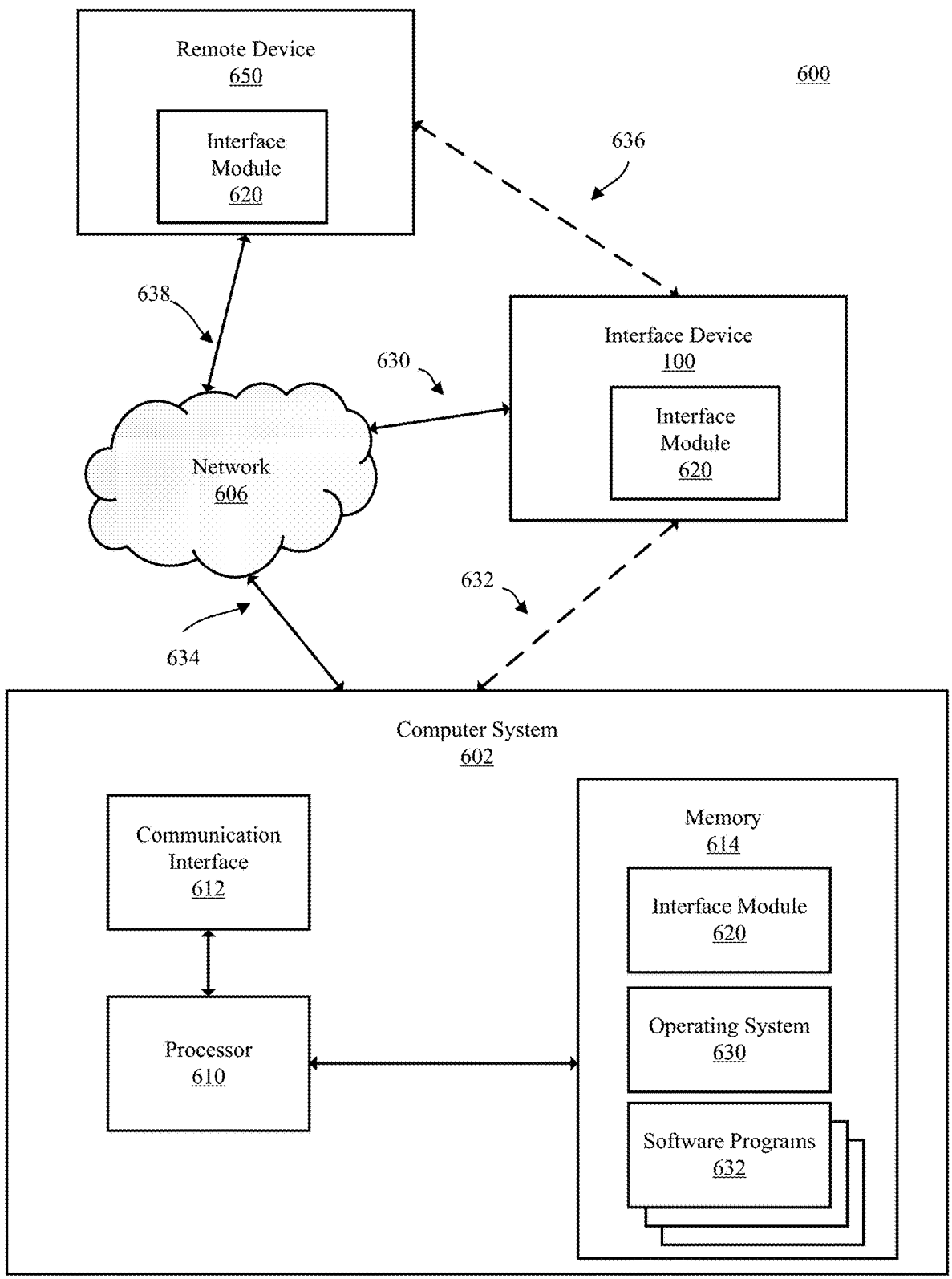
FIG. 6 depicts a block diagram of an environment including a multi-input interface device according to aspects of the present disclosure.

FIG. 6 depicts an example of a computing environment 600 in which the interface device 100 can be used, in accordance with various aspects of the present disclosure. While FIG. 6 illustrates various components, systems, and entities that can be included in the computing environment 600, additionally components, systems, and entities can be added and components, systems, and entities, which are illustrated, can be removed.

As illustrated in FIG. 6, the computing environment 600 can include a computer system 602 that communicates with the interface device 100. The computer system 602 can represent one or more computer devices and/or electronic devices that are communicating with and receiving input from the interface device 100. The computer system 602 can include a processor 610, a communication interface 612, and a memory 614. The processor 610 can include any suitable number of processors and/or processor types. The processor 610 can include one or more suitable processors (e.g., central processing units (CPUs) and/or graphics processing units (GPUs)). The processor 610 can be connected to the memory 614 via a computer bus (not depicted) responsible for transmitting electronic data, data packets, or otherwise electronic signals to and from the processor 610 and memory 614 in order to implement or perform the machine-readable instructions, methods, processes, elements or limitations, as illustrated, depicted, or described for the various flowcharts, illustrations, diagrams, figures, and/or other disclosure herein. The processor 610 can interface with the memory 614 via a computer bus to execute an operating system (OS) 640 and/or computing instructions contained therein, and/or to access other services/aspects. For example, the processor 610 can interface with the memory

614 via the computer bus to create, read, update, delete, or otherwise access or interact with the data stored in the memory 614 and/or a storage devices (internal and/or external), such as a database.

The memory 614 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 614 can store an interface module 620, as described below. The memory 614 can store the OS 640 (e.g., Microsoft Windows, Linux, UNIX, MacOS, etc.) capable of facilitating the functionalities, apps, methods, or other software as discussed herein. The memory 614 can also include one or more software programs 642 that can be executed on the computer system 602.

In general, a software program, computer program, computer based product, application, or code (e.g., the model(s), such as artificial intelligence (AI) and/or machine learning (ML) models, or other computing instructions described herein) can be stored on a computer usable storage medium, or tangible, non-transitory computer-readable medium (e.g., a standard random access memory (RAM), an optical disc, a universal serial bus (USB) drive, or the like) having such computer-readable program code or computer instructions embodied therein, wherein the computer-readable program code or computer instructions can be installed on or otherwise adapted to be executed by the processor 610 (e.g., working in connection with the respective operating system in memory 614) to facilitate, implement, or perform the machine readable instructions, methods, processes, elements or limitations, as illustrated, depicted, or described for the various flowcharts, illustrations, diagrams, figures, and/or other disclosure herein. In this regard, the program code can be implemented in any desired program language, and can be implemented as machine code, assembly code, byte code, interpretable source code or the like (e.g., via Golang. Python, C, C++, C#, Objective-C, Java, Scala, ActionScript, JavaScript, HTML, CSS, XML, etc.).

A database, which can communicate with the computer system 602, can be a relational database, such as Oracle, DB2, MySQL, a NoSQL based database, such as MongoDB, or another suitable database. The database can be local to the computer system 602. The database can be remote from the computer system 602 and communicate, for example, via a network 606.

The network 606 can be a single communication network or can include multiple communication networks of one or more types (e.g., one or more wired and/or wireless local area networks (LANs), and/or one or more wired and/or wireless wide area networks (WANs) such as the internet). For example, the network 606 can include a wireless cellular service (e.g., 4G, 5G, 6G, etc.). In one aspect, the network 606 can include a cellular base station, such as cell tower(s), communicating to the computer system 602 via wired/wireless communications based on any one or more of various mobile phone standards, including NMT, GSM, CDMA, UMTS, LTE, 5G, 6G, or the like. Additionally or alternatively, the network 606 can comprise one or more routers, wireless switches, or other such wireless connection points communicating to the components of the computer system 602 via wireless communications based on any one or more of various wireless standards, including by non-limiting example, IEEE 802.11a/b/g/n/ac/ax/be (WIFI), Bluetooth, and/or the like. In some embodiments, the computer system 602 can connect to the network 606 via the communications interface 612.

As described herein and in an aspect, the functionality of the computer system 602 can be embodied in one or more servers. The one or more servers can perform the functionalities as part of a cloud network or can otherwise communicate with other hardware or software components within one or more cloud computing environments to send, retrieve, or otherwise analyze data or information described herein. For example, in certain aspects of the present techniques, the computer system 602 can comprise an on-premise computing environment, a multi-cloud computing environment, a public cloud computing environment, a private cloud computing environment, and/or a hybrid cloud computing environment. For example, an entity (e.g., a business) providing a chatbot to enable remediation provider and/or insurance provider notification can host one or more services in a public cloud computing environment (e.g., Alibaba Cloud, Amazon Web Services (AWS), Google Cloud, IBM Cloud, Microsoft Azure, etc.). The public cloud computing environment can be a traditional off-premise cloud (i.e., not physically hosted at a location owned/controlled by the business). Alternatively, or in addition, aspects of the public cloud can be hosted on-premise at a location owned/controlled by a structure owner or lessee. The public cloud can be partitioned using visualization and multi-tenancy techniques and can include one or more infrastructure-as-a-service (IaaS) and/or platform-as-a-service (PaaS) services.

The computer environment 600 can also include a remote device 650. The remote device 650 can be any type of electronic device that can communicate with the interface device 100 and receive input from the interface device 100. For example, the remote device 650 can include remotely-operated vehicles (e.g., robotic systems, drones, remotely controlled automobiles, remotely controlled aircraft, and the like.)

In some embodiments, the interface device 100 can communicate with the computer system 602 and/or the remote device 650 via the network 606. For example, the interface device 100 can communicate with the network 606 via a connection 630. The computer system 602 can communicate with the network 606 via a connection 634. The remote device 650 can communicate with the network 606 via a connection 638. In some embodiments, the interface device 100 can directly communicate with the computer system 602 via a direct connection 632. In some embodiments, the interface device 100 can directly communicate with the remote device via a direct connection 636.

To translate the input received from the interface device 100, the interface device 100, the computer system 602, and/or the remote device can include an interface module 620. The interface module 620 can include a set of computer-executable implementing the communication with the interface device 100 and the translation of input. The interface module 620 can include the necessary logic, commands, and algorithms to translate the input received at the interface device 100 into operations. In some embodiments, the memory 614 can store a copy of the interface module 620. In some embodiments, the interface device 100 can store a copy of the interface module 620. In some embodiments, the remote device 650 can store a copy of the interface module 620.

The interface module 620 can include a translation table and/or library that translates the input data received from the interface device 100, e.g., movement data of the base unit 102 and/or auxiliary unit 104, rotational data of the base unit 102 and/or auxiliary unit 104, input data for the input devices of the base unit 102 and/or auxiliary unit 104, into an operation to be performed by the computer system 602 and/or the remote device 650. The interface module 620 can store one or more translation tables and/or libraries, where each translation table and/or library correspond to a software program 642 or a remote device 650. The interface module 620 can include logic, commands, and algorithms that allow a user to configure how the input is translated into custom operations performed by the computer system 602 and/or the remote device 650.

Tables 1 illustrates a simplified version of a translation table for controlling and interfacing with objects displayed on a display of the computer system 602, when the interface device is operating in independent mode. Tables 2 illustrates a simplified version of a translation table for controlling and interfacing with objects displayed on a display of the computer system 602, when the interface device is operating in absolute mode. Tables 1 and 2 illustrates a simplified versions in plain text for illustration proposes and can include additional input and operations. One skilled in the art will realize that the translation table and/or library can be implemented in computer languages and/or instructions that are readable by the computer system 602 and/or the remote device 650. Additionally, any of the operations listed in Tables 1 and 2 can be predefined or customized by a user of the interface device 100.

TABLE 1

| Input Data | Operation | Example Operation |
| --- | --- | --- |
| Translational Movement of Base Unit 102 | Operation A | Course Movement of a Display Cursor |
| Translational Movement of Auxiliary Unit 104 | Operation B | Fine Movement of a Display Cursor |
| Selection of input device 120 | Operation C | Selection of a displayed object |
| Actuation of input device 120 + Translational Movement of Base Unit 102 | Operation D | Selection of a displayed object and movement of the displayed object |
| Actuation of input device 120 + Rotational Movement of Base Unit 102 | Operation E | Selection of a displayed object and rotation of the displayed object |
| Actuation of input device 142 + Translational Movement of Auxiliary Unit 104 | Operation F | Generation of a selection box and increase/decrease of the selection box |
| Actuation of input device 140 + Rotational Movement of Auxiliary Unit 104 | Operation G | Generation of a selection circle and increase/decrease of the selection circle |
| Actuation of input device 120 + Actuation of input device 142 + Translational Movement of Base Unit 102 and/or Auxiliary Unit 104 | Operation H | Temporally place interface device in absolute mode and Course Movement of a Display Cursor |

TABLE 2

| Input Data | Operation | Example Operation |
| --- | --- | --- |
| Translational Movement of Base Unit 102 and Auxiliary Unit 104 | Operation AA | Course Movement of a Display Cursor |
| Selection of input device 120 | Operation BB | Selection of a displayed object |
| Actuation of input device 120 + Translational Movement of Base Unit 102 and Auxiliary Unit 104 | Operation CC | Selection of a displayed object and movement of the displayed object |
| Actuation of input device 120 + Rotational Movement of Base Unit 102 and Auxiliary Unit 104 | Operation DD | Selection of a displayed object and rotation of the displayed object |
| Actuation of input device 142 + Translational Movement of Auxiliary Unit 104 | Operation EE | Utilize input data from Auxiliary Unit 104 and Fine Movement of a Display Cursor |
| Actuation of input device 120 + Actuation of input device 142 + Translational Movement of Base Unit 102 and/or Auxiliary Unit 104 | Operation FF | Sticky Selection of a displayed object and movement of the displayed object. |

In some embodiments, the interface module 620, the OS 640, and/or the software programs 642 can include one or more natural language processing (NLP) modules for communicating with the computer system 602. For example, the interface device 100 can include a microphone for receiving audio input. The NLP modules comprising a set of computer-executable instructions implementing NLP, natural language understanding (NLU) and/or natural language generator (NLG) functionality. The NLP modules can be responsible for transforming the user input (e.g., unstructured conversational input such as speech or text) to an interpretable format. The NLP modules can include an NLU to understand the intended meaning of utterances and/or prompts, among other things. The NLP modules can include an NLG, which can provide text summarization, machine translation, and/or dialog where structured data is transformed into natural conversational language (i.e., unstructured) for output to the user.

In some embodiments, the interface module 620, the OS 640, and/or the software programs 642 can include and/or communicate with voice bots or chatbots for communicating with the computer system 602. For example, the interface device 100 can include a microphone for receiving audio input. Voice bots or chatbots discussed herein can be configured to utilize AI and/or ML techniques. For instance, the voice bot or chatbot can be a ChatGPT chatbot. The voice bots or chatbots can generate human-like responses to text inputs and engage in conversations with users of the computer system 602. The voice bot or chatbot can employ supervised or unsupervised machine learning techniques, which can be followed or used in conjunction with reinforced or reinforcement learning techniques. The voice bot or chatbot can employ the techniques utilized for ChatGPT. The voice bot or chatbot can deliver various types of output for user consumption in certain embodiments, such as verbal or audible output, a dialogue output, text or textual output (such as presented on a computer or mobile device screen or display), visual or graphical output, and/or other types of outputs. The voice bot or chat bot can be programmed to simulate human conversation, interact with users, understand their needs, and recommend an appropriate line of action with minimal and/or no human intervention, among other things. This can include providing the best response of any query that it receives and/or asking follow-up questions.

Aspects described herein can include automated machine learning to determine data risk levels, identify relevant data risk factors, and evaluate the data security factors. Although the methods described elsewhere herein may not directly mention machine learning techniques, such methods can be read to include such machine learning for any determination or processing of data that can be accomplished using such techniques. In some embodiments, such machine-learning techniques can be implemented automatically upon occurrence of certain events or upon certain conditions being met. Use of machine learning techniques, as described herein, can begin with training a machine learning program, or such techniques can begin with a previously trained machine learning program.

Additionally or alternatively, the machine learning programs can be trained by inputting sample data sets or certain data into the programs, such as data security factors discussed herein. The machine learning programs can utilize deep learning algorithms that are primarily focused on pattern recognition and can be trained after processing multiple examples. The machine learning programs can include Bayesian program learning (BPL), voice recognition and synthesis, image or object recognition, optical character recognition, and/or natural language processing, either individually or in combination. The machine learning programs can also include natural language processing, semantic analysis, automatic reasoning, and/or machine learning.

In supervised machine learning, a processing element can be provided with example inputs and their associated outputs, and can seek to discover a general rule that maps inputs to outputs, so that when subsequent novel inputs are provided the processing element can, based upon the discovered rule, accurately predict the correct or a preferred output. In unsupervised machine learning, the processing element can be required to find its own structure in unlabeled example inputs. These techniques can be followed by reinforced or reinforcement learning techniques.

It will be understood that the above disclosure is one example and does not necessarily describe every possible embodiment. As such, it will be further understood that alternate embodiments can include fewer, alternate, and/or additional steps or elements.

While FIG. 6 shows only one computer system 602, it is understood the computer system 602 can be composed of multiple computer system and devices that are in remote communication, for example, via the network 606.

Figure 7:
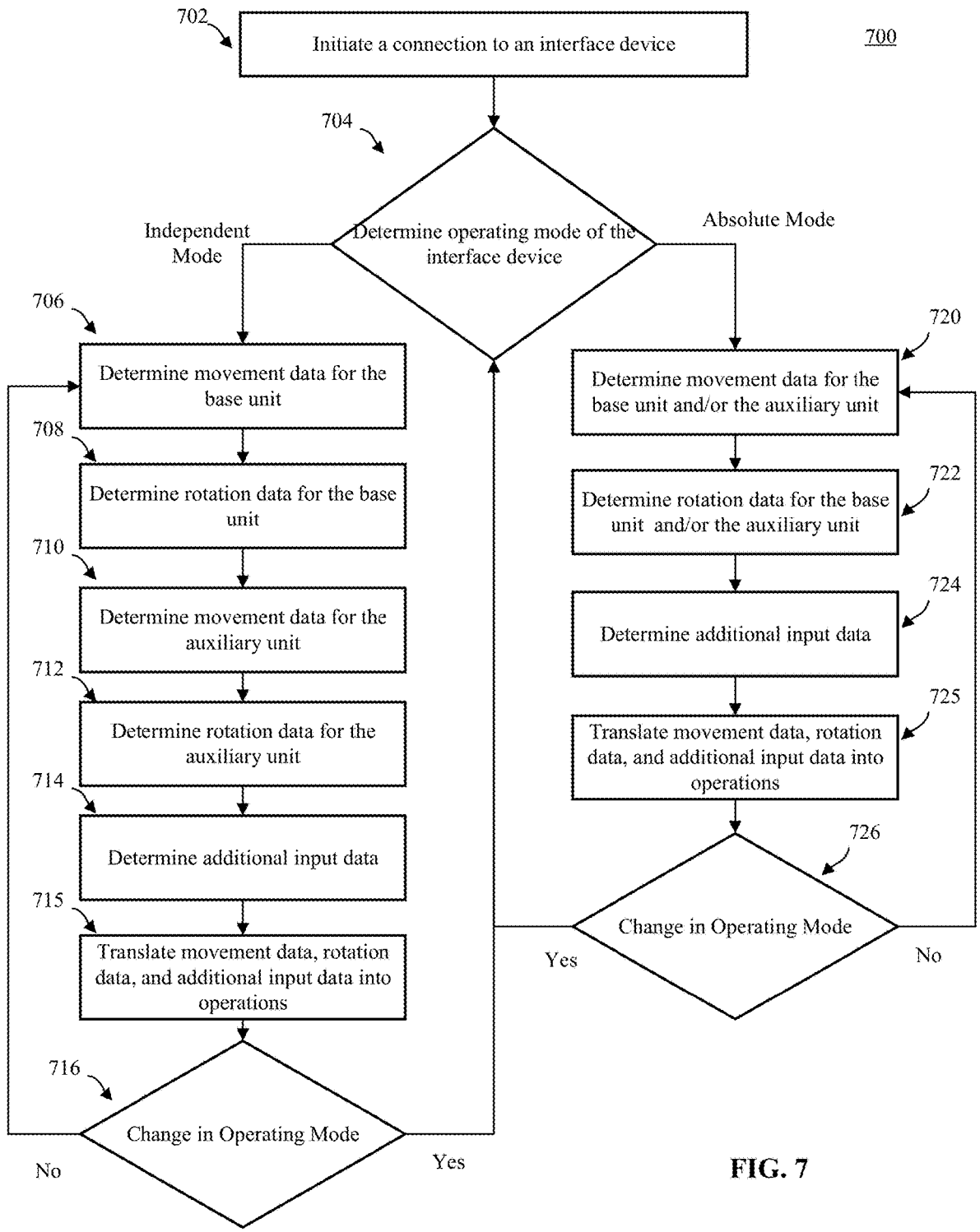
FIG. 7 depicts a flow diagram of a process of operating a multi-input interface device according to aspects of the present disclosure.

FIG. 7 is a flow diagram of an exemplary method 700 for operating a multi-input interface device. The method 700 can be implemented by hardware and/or software contained within a multi-input interface device, e.g., the interface device 100. The method 700 can be implemented by one or more processors of a computing system such as the computer system 602, which is communicating with a multi-input interface device, e.g., the interface device 100. Alternatively or additionally, the method 700 can be implemented by one or more processors of a distributed system, which is communicating with a multi-input interface device, e.g., the interface device 100. The method implemented by one or more remote electronic devices, e.g., remote device 650, which is communicating with a multi-input interface device, e.g., the interface device 100.

At block 702, a connection is initiated with an interface device. The interface device 100 can be coupled to an electronic device such as the computer system 602 or the remote device 650. For example, the interface device 100 can be directly connected to the computer system 602 by the connection 632, or the interface device 100 can be directly connected to the remote device by the connection 636. In another example, the interface device 100 can communicate with the computer system 602 via the network 606, or the interface device 100 can communicate with the remote device 650 via the network 606.

At block 704, the operating mode of the interface device is determined. For example, the interface device 100 operate in two modes: an independent mode and an absolute mode. In independent mode, the base unit 102 and the auxiliary unit 104 can be operated to provide independent inputs to the computer system 602 and/or the remote device 650. In the absolute mode, the base unit 102 and the auxiliary unit 104 can operate as a single unit to provide inputs to the computer system 602 and/or the remote device 650.

Figure 8:
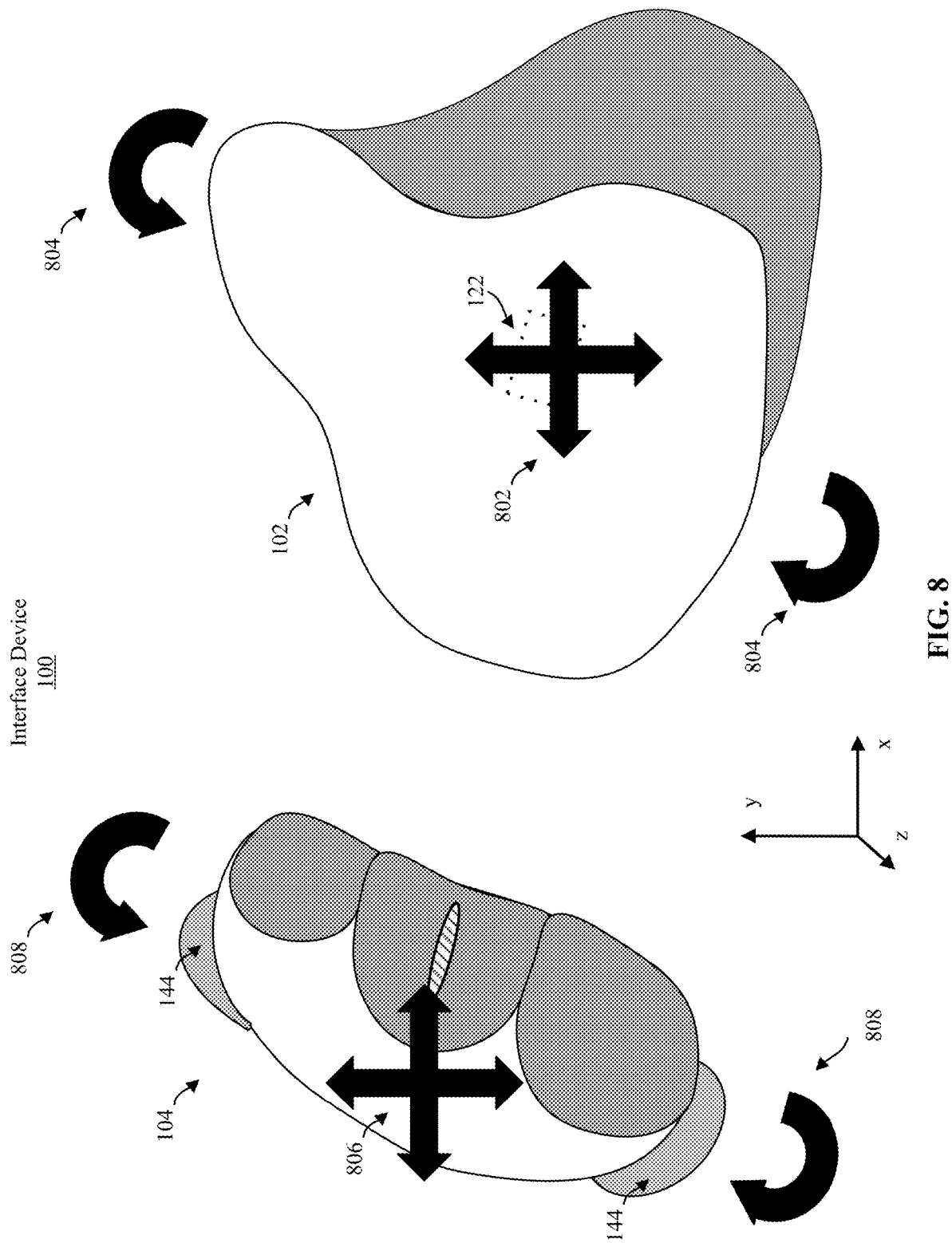
FIG. 8 depicts a top, perspective view of a multi-input interface device during operations according to aspects of the present disclosure.

If the interface device is operating in independent mode, at block 706, movement data for a base unit is determined. The movement data can include 2D and/or 3D movement of the base unit relative to a surface. For example, as illustrated in FIG. 8, the base unit 102 can experience translational movement 802, i.e., movement in the x, y, z directions, based on a user control of the base unit 102 using a portion of a hand (e.g., palm and thumb.) The movement data can be detected by the base sensor unit 122 and transmitted to the computer system 602 and/or the remote device 650.

At block 708, rotational data for the base unit is determined. For example, as illustrated in FIG. 8, the base unit 102 can also experience rotational movement 804, i.e., rotational about an axis extending in the z-direction, based on the user control of the base unit 102 using the same portion of the hand (e.g., palm and thumb.) The rotational data can be detected by the base sensor unit 122 and transmitted to the computer system 602 and/or the remote device 650.

At block 710, movement data for the auxiliary unit is determined. In the independent mode, the user can also provide independent input using the auxiliary unit 104 using a different portion of the hand (e.g., one or more fingers of the hand.) For example, as illustrated in FIG. 8, the auxiliary unit 104 can experience translational movement 806, i.e., movement in the x, y, z directions, based on a user control of the auxiliary unit 104 using the different portion of the hand (e.g., one or more fingers of the hand.) The movement data can be detected by the auxiliary sensor unit 144 and transmitted to the computer system 602 and/or the remote device 650.

At block 712, rotational data for the auxiliary unit is determined. For example, as illustrated in FIG. 8, the auxiliary unit 104 can also experience rotational movement 808, i.e., rotation about an axis extending in the z-direction, based on the user control of the auxiliary unit 104 using the different portion of the hand (e.g., one or more fingers of the hand.) The rotational data can be detected by the auxiliary sensor unit 144 and transmitted to the computer system 602 and/or the remote device 650.

At block 714, additional input data is determined for the base unit and/or auxiliary unit. For example, the user can provide additional input by actuating one or more of the input devices of the base unit 102 and/or the auxiliary unit 104 (e.g., the input devices 120, the first input device 140, the second input device 141, the third input device 142, and the fourth input device 143.) The determination of input data in blocks 708, 710, 712, and 714 can occur simultaneously or sequentially, in any order, depending on the input by the user. For example, a user can move the base unit 102 and auxiliary unit 104, simultaneous. As such, the detection of the movement can be determined simultaneously. In another example, a user can move the base unit 102 while actuating an input device of the auxiliary unit 104.

At block 715, the movement data, the rotational data, and/or additional input data is translated into operations. For example, the movement data, the rotational data, and/or additional input data of the base unit 102 and the auxiliary unit 104 can be translated by the interface module 620 into operations to be performed by the computer system 602 and/or the remote device 650. Once the operation is determined, the computer system 602 and/or the remote device 650 can perform the operations.

For example, as illustrated in FIGS. 9A-9E, the user can be using the interface device 100 to control the movement of a robot 904 having an arm 906 and vision system 908 that is displayed on a display 902. In this example, the movement and operation of the robot 904 can be controlled by input provided to the interface device 100. In an embodiment, the robot 904 can be a virtual robot that is generated by one or more software programs executing on the computer system 102. In an embodiment, the robot 904 can be a virtual representation of a real-world robot operating as remote device 650.

Figure 9A:
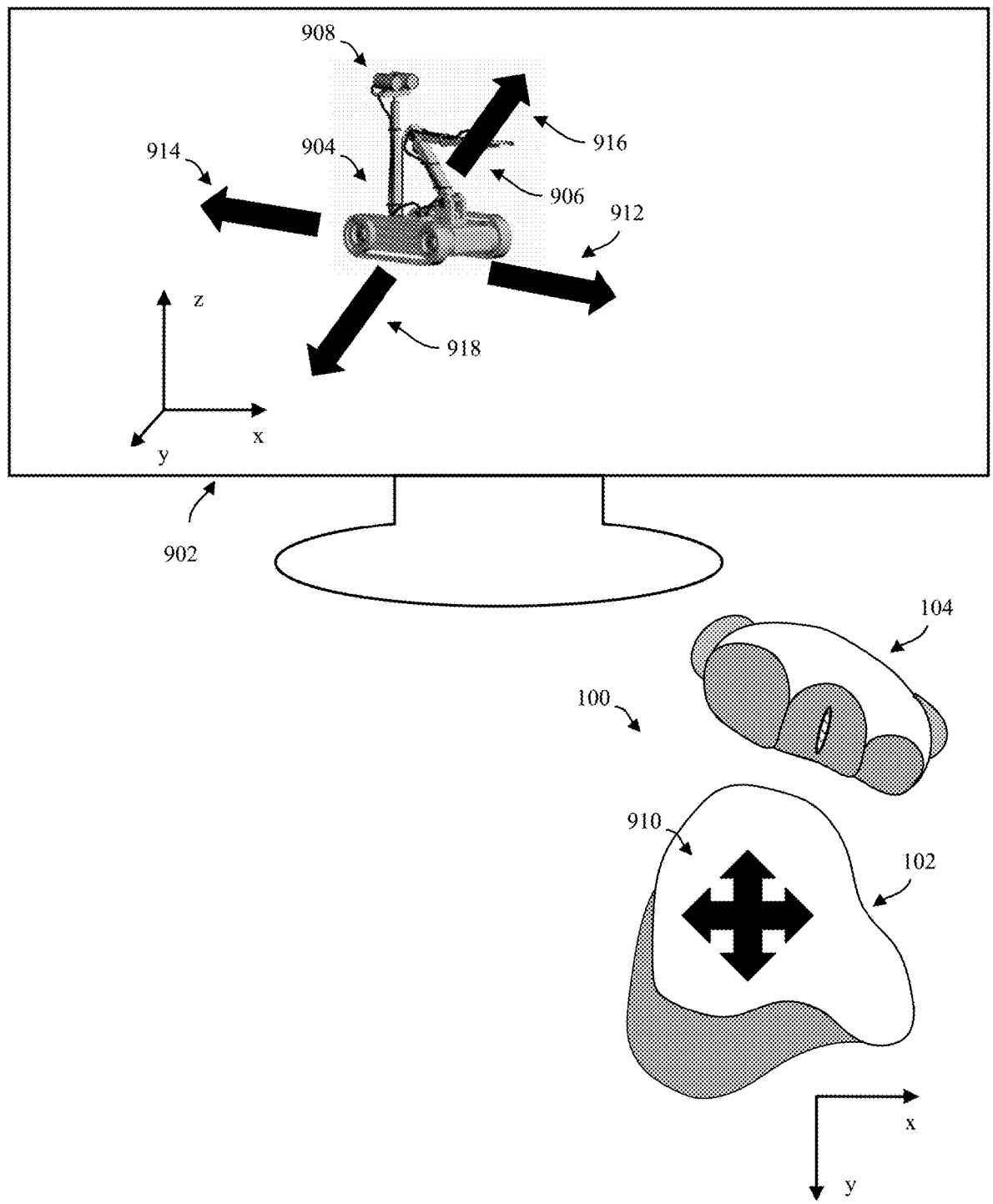
FIG. 9A-9F depict simplified views of a multi-input interface device operating with a computer device according to aspects of the present disclosure.

As illustrated in FIG. 9A, a user can perform base unit translational movement 910 on the base unit 102 in the x-direction and y-direction, and the movement data can be captured by the base unit 102. The movement data can then be translated into movement operations of the robot 904, e.g., robot forward movement 912, robot back movement 914, robot left movement 916, and robot right movement 918.

Figure 9B:
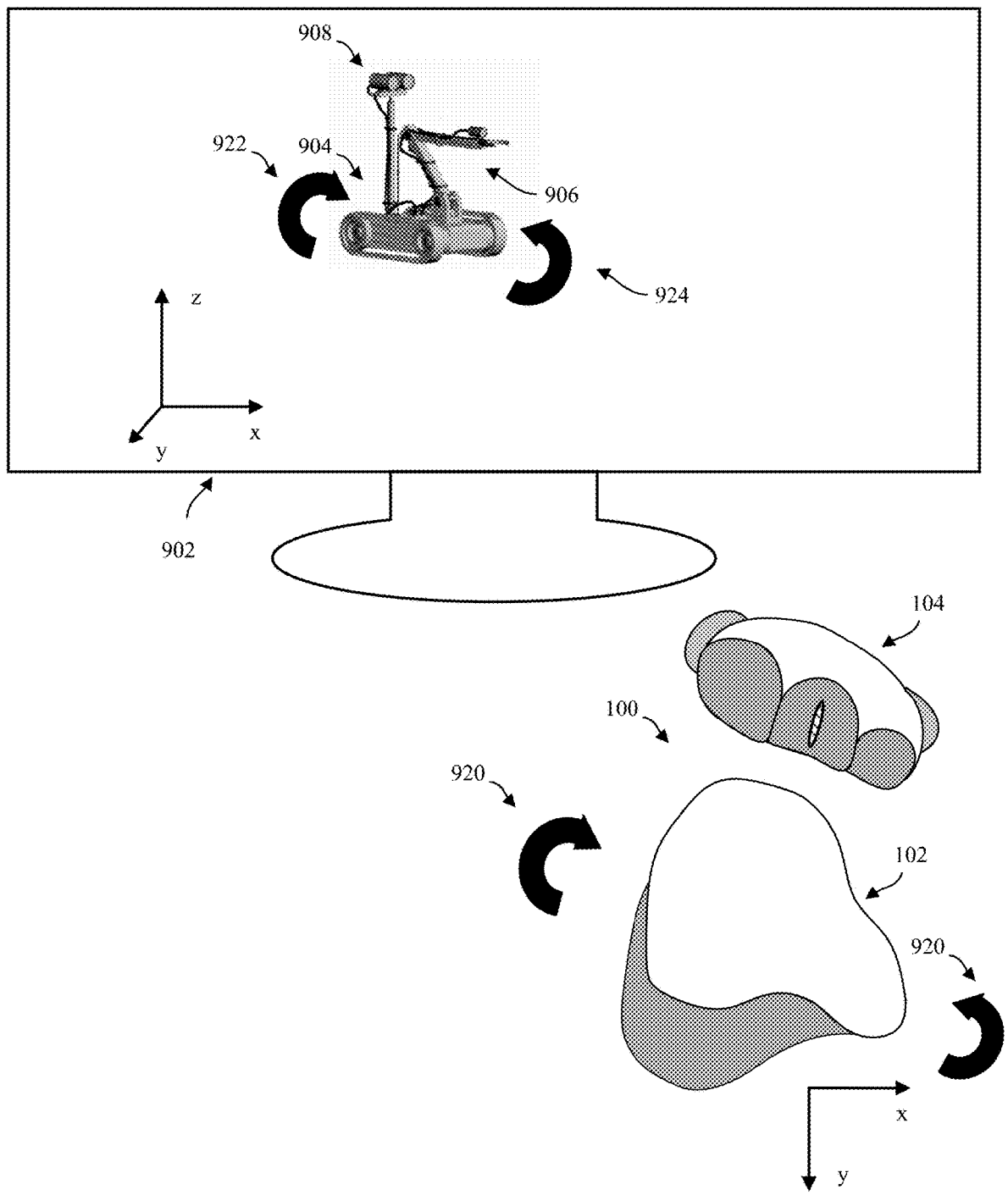

As illustrated in FIG. 9B, a user can perform base unit rotation 920 on the base unit 102, and the rotational data can be captured by the base unit 102. The rotational data can then be translated into movement operations of the robot 904, e.g., robot clockwise rotational 922 and robot counter-clockwise rotational 924.

Figure 9C:
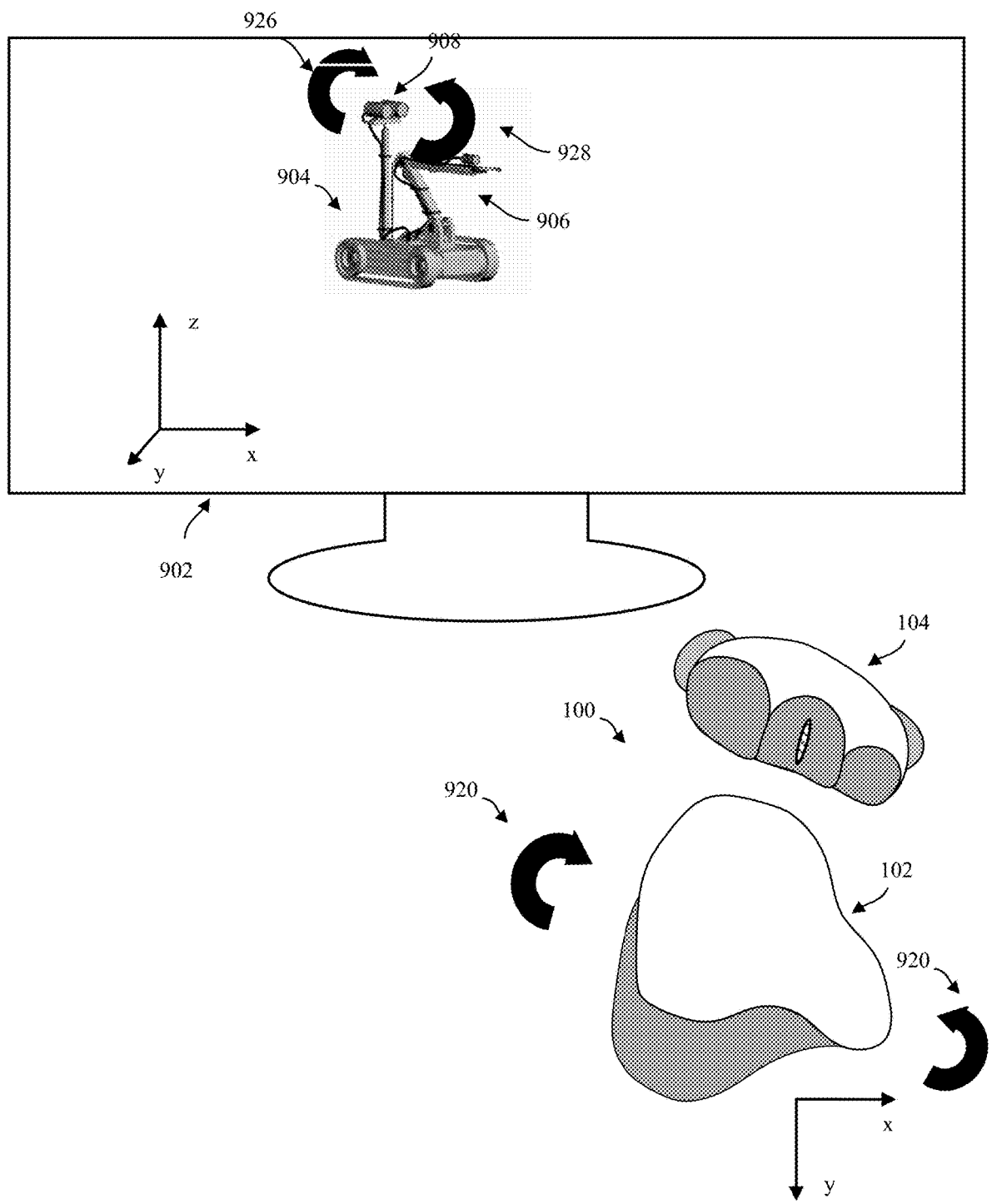

As illustrated in FIG. 9C, the movement and/or rotational of the base unit 102 can also be translated into a different operation based on the actuation of an input device of the base unit 102. For example, a user can actuate the input device 120 (e.g., button) of the base unit 102 while performing the base unit rotation 920 on the base unit 102, and the rotational data can be captured by the base unit 102. Because the input device 120 has been actuated during the base unit rotation 920, the interface module 620 can translate the base unit rotation 920 into a different operation for the robot 904, e.g., clockwise rotational 926 of the vision system 908 or counter-clockwise rotational 928 of the vision system 908.

Figure 9D:
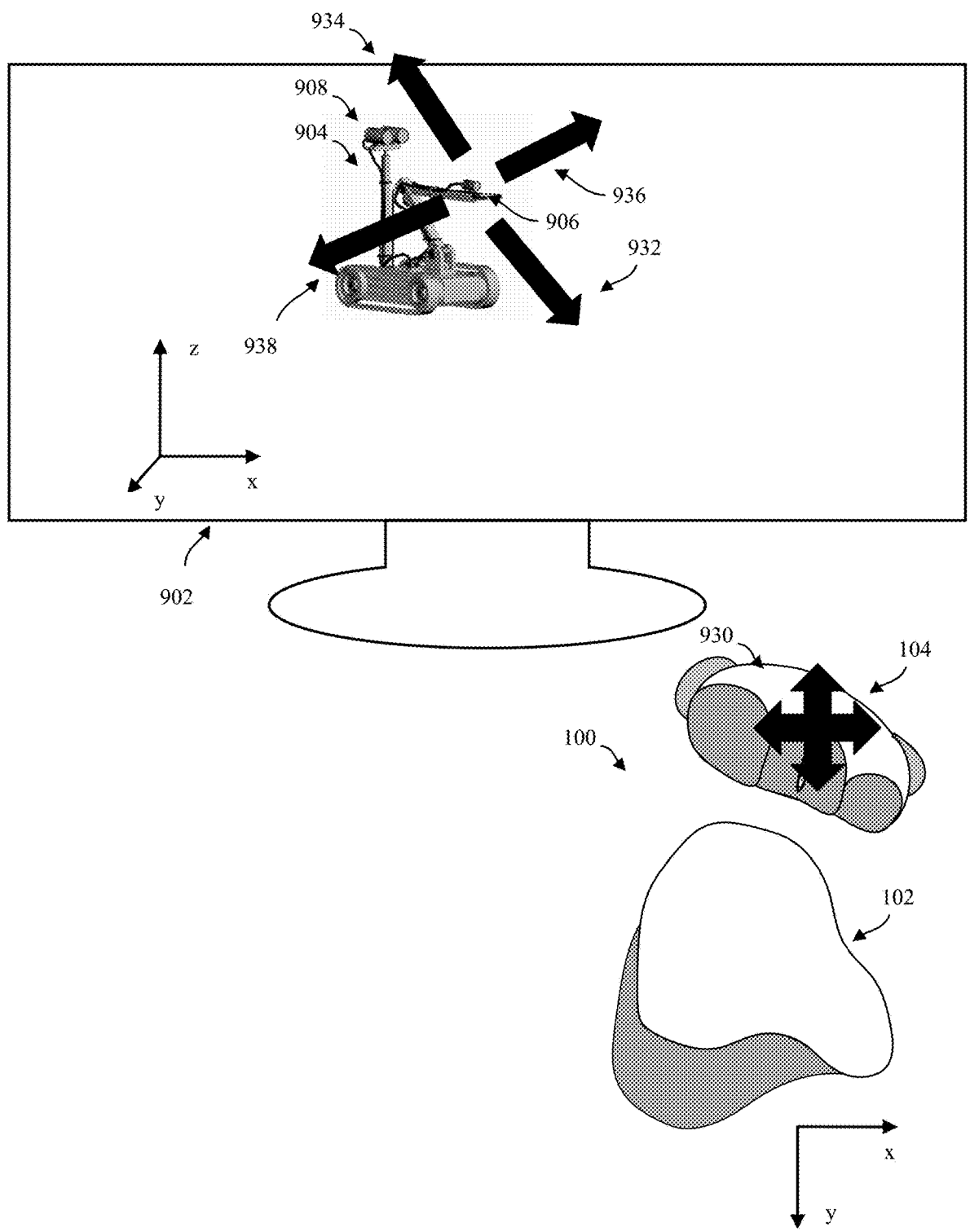

As illustrated in FIG. 9D, the independent movement of the auxiliary unit 104 can correspond to different operations of the robot 904, e.g., movement of the robot arm. For example, a user can perform auxiliary unit translational movement 930 on the auxiliary unit 104 in the x-direction and y-direction, and the movement data can be captured by the auxiliary unit 104. The movement data can then be translated into movement operations of the robot are 906, e.g., robot arm forward movement 932, robot arm back movement 934, robot arm left movement 936, and robot arm right movement 938.

Figure 9E:
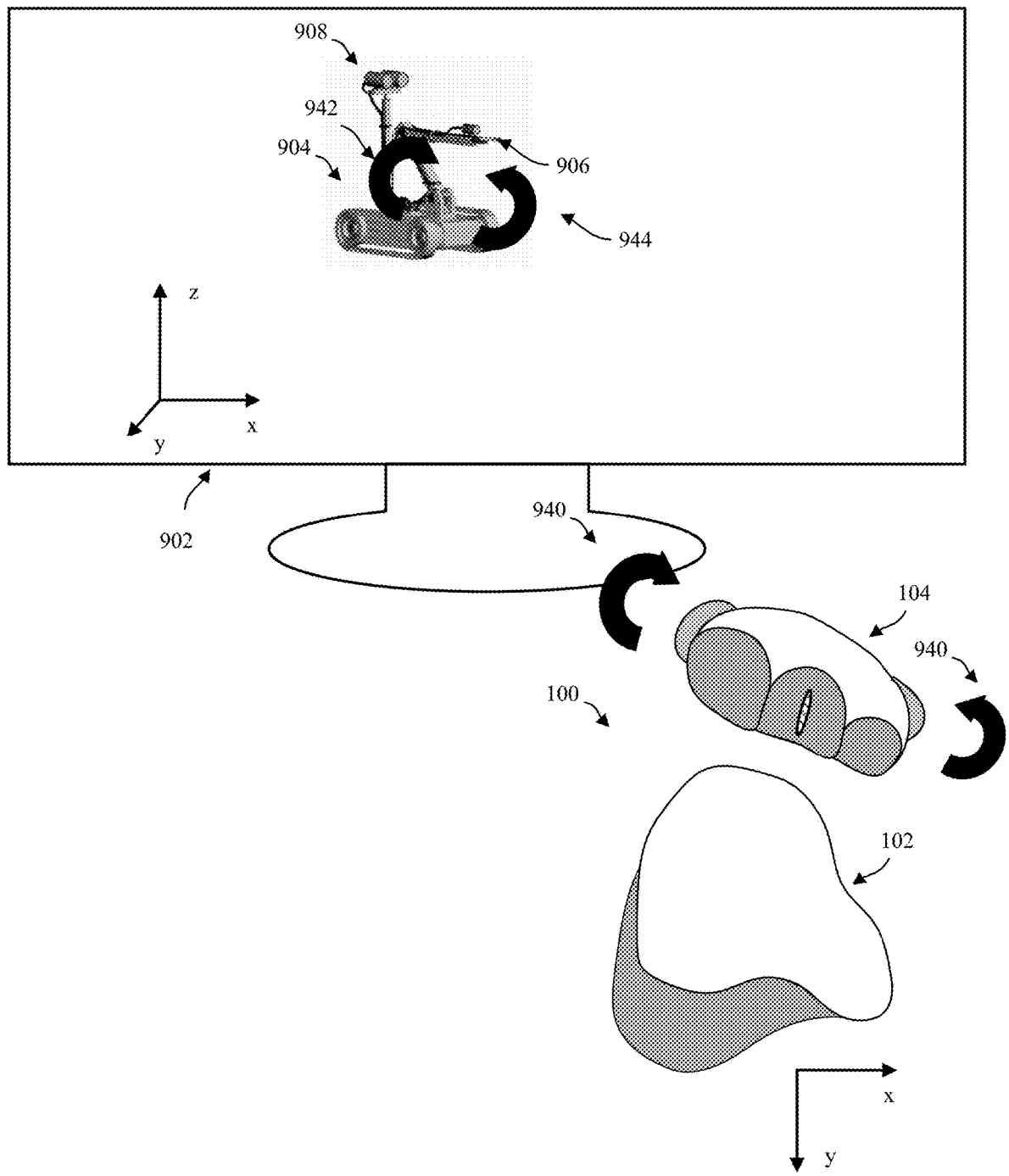

As illustrated in FIG. 9E, the independent rotational of the auxiliary unit 104 can correspond to different operations of the robot 904, e.g., rotational of the robot arm. For example, a user can perform auxiliary unit rotation 940 on the auxiliary unit 104, and the rotational data can be captured by the auxiliary unit 104. The rotational data can then be translated into rotational operations of the robot arm 906, e.g., robot arm clockwise rotational 942 and robot arm counter-clockwise rotational 944.

Figure 9F:
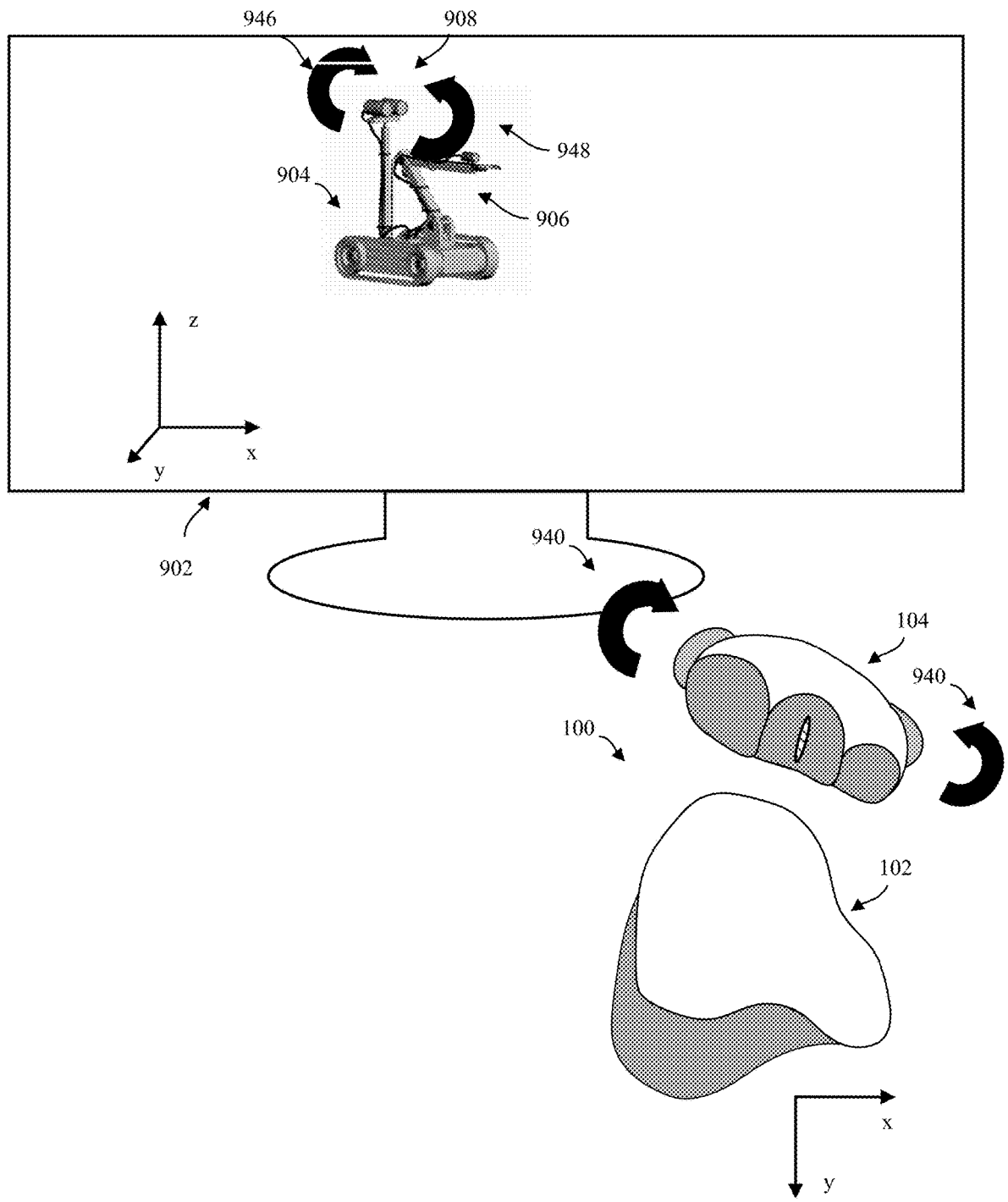

As illustrated in FIG. 9F, the rotational and/or movement of the auxiliary unit 104 can also be translated into a different operation based on the actuation of an input device of the auxiliary unit 104. For example, a user can actuate the input device (e.g., button) of the auxiliary unit 104 while performing the auxiliary unit rotation 940 on the auxiliary unit 104, and the rotational data can be captured by the auxiliary unit 104. Because the input device has been actuated during the auxiliary unit rotation 940, the interface module 620 can translate the auxiliary unit rotation 940 into a different operation for the robot 904, e.g., clockwise rotational 946 of the vision system 908 or counter-clockwise rotational 948 of the vision system 908.

Returning to FIG. 7, at block 716, it is determined if the operating mode has changed. If the operating mode has not changed, the method 700 returns to block 706 and further input is monitored while the interface device is in independent mode. If the mode has changed, the method can return to block 704 to determine the new operating mode.

At block 720, if the interface device is operating the absolute mode, movement data for the base unit and/or the auxiliary unit is determined. For example, in absolute mode, the interface device 100 operates as a single unit. In an embodiment, the movement data can be captured by the base unit 102 or captured by the auxiliary unit 104. In an embodiment, the movement data can be captured by both the base unit 102 and the auxiliary unit 104, the movement data can be combined to represent movement data of the interface device as a single unit.

For example, the base unit 102 and the auxiliary unit 104, as a single unit, can experience translational movement, i.e., movement in the x, y, z directions, based on a user control of the base unit 102 and the auxiliary unit 104 (coupled together) using the hand. The movement data can be detected by the base sensor unit 122 and/or the auxiliary sensor unit 144 and transmitted to the computer system 602 and/or the remote device 650.

At block 722, rotational data for the base unit and/or the auxiliary unit is determined. For example, the base unit 102 and the auxiliary unit 104, as a single unit, can experience rotational movement, i.e., movement about an axis, based on a user control of the base unit 102 and the auxiliary unit 104 (coupled together) using the hand. The movement data can be detected by the base sensor unit 122 and/or the auxiliary sensor unit 144 and transmitted to the computer system 602 and/or the remote device 650.

At block 724, additional input data is determined for the base unit and/or auxiliary unit. For example, the user can provide additional input by actuating one or more of the input devices of the base unit 102 and/or the auxiliary unit 104 (e.g., the input devices 120, the first input device 140, the second input device 141, the third input device 142, and the fourth input device 143.) The determination of input data in blocks 720, 722, and 724 can occur simultaneously or sequentially, in any order, depending on the input by the user. For example, a user can move the base unit 102 and auxiliary unit 104, as a single unit, while actuating an input device of the auxiliary unit 104 and/or the base unit 102. In another example, the user can first move the base unit 102 and auxiliary unit 104, as a single unit, and then actuate an input device of the auxiliary unit 104 and/or the base unit 102.

At block 725, the movement data, the rotational data, and/or additional input data is translated into operations. For example, the movement data, the rotational data, and/or additional input data of the base unit 102 and auxiliary unit 104, as a single unit, can be translated by the interface module 620 into operations to be performed by the computer system 602 and/or the remote device 650. Once the operation is determined, the computer system 602 and/or the remote device 650 can perform the operations.

At block 726, it is determined if the operating mode has changed. If the operating mode has not changed, the method 700 returns to block 720 and further input is monitored while the interface device is in absolute mode. If the mode has changed, the method can return to block 704 to determine the new operating mode.

The method 700 above is described as detecting two (2) modes of an interface device, e.g., interface device 100. The method 700 can also be modified to detect any number of modes, additional or fewer. Additionally, while the method 700 indicates that an interface device, e.g., interface device 100, operates in a single mode, the interface device, e.g., interface device 100 can operate in multiple modes simultaneously, which are determined in the method. For example, as described herein, the method 700 at block 704 can determine one or more modes from multiple modes, e.g., independent mode, absolute mode, return-to-center mode, resistance mode, etc. In any modes determined, the method 700 can determine translation movement, rotational movement, and/or additional input to the interface device 100 and translate the input to operation on an electronic device.

Aspects of the present disclosure can include the following examples of embodiments.

Embodiment 1 includes a multi-input interface device. The multi-input device includes one or more units comprising one or more sensor units positioned within a portion of the one or more units and configured to detect a first relative movement of the one or more units; and one or more auxiliary units comprising one or more auxiliary sensor units positioned within a portion of the one or more auxiliary units and configured to detect a second relative movement of the one or more auxiliary units. The one or more units and the one or more auxiliary units are formed as separate units, and the one or more units and the one or more auxiliary units are configured to be operated by a user.

Embodiment 2 includes the multi-input interface device of embodiment 1, wherein each of the one or more units comprise a base housing configured to house the one or more sensor units, wherein the base housing is structured to allow control by a first portion of the user; and each of the one or more auxiliary units comprise an auxiliary housing configured to house the one or more auxiliary sensor units, wherein the auxiliary housing is structured to allow control by a second portion of the user.

Embodiment 3 includes the multi-input interface device of embodiment 2, wherein the first portion of the user is different from the second portion of the user.

Embodiment 4 includes the multi-input interface device of embodiment 2, wherein the one or more units comprise one or more input devices; and the one or more auxiliary units comprise one or more auxiliary input devices forming a portion of a top surface of the auxiliary housing.

Embodiment 5 includes the multi-input interface device of embodiment 1, wherein the one or more sensor units are configured to detect one or more of translation movement of the one or more units and rotational movement of the one or more units; and the one or more auxiliary sensor units are configured to detect one or more of translation movement of the one or more auxiliary units and rotational movement of the one or more auxiliary units.

Embodiment 6 includes the multi-input interface device of embodiment 1, further comprising a connector bar configured to be coupled to the one or more units and the one or more auxiliary units.

Embodiment 7 includes the multi-input interface device of embodiment 6, wherein the connector bar is formed of a rigid material and causes the one or more units and the one or more auxiliary units to operate a single unit.

Embodiment 8 includes the multi-input interface device of embodiment 6, wherein the connector bar is formed of a semi-rigid, elastic material that limits movement of the one or more units and the one or more auxiliary units relative to one another.

Embodiment 9 includes the multi-input interface device of embodiment 8, further comprising one or more connector bar sensor units configured to measure physical properties of the connector bar during the movement of the one or more units and the one or more auxiliary units relative to one another.

Embodiment 10 includes a method for detecting input. The method includes determining an operating mode of a multi-input interface device comprising at least one base unit and at least one auxiliary unit, wherein the operating mode defines input received from the at least one base unit and the at least one auxiliary unit, and the at least one base unit and the at least one auxiliary unit are separate units. The method includes determining a first input received at the at least one base unit caused by a first interaction of a user with the at least one base unit; translating the first input into a first operation to be performed by an electronic device; determining a second input receive at the at least one auxiliary unit caused by a second interaction of the user with the at least one auxiliary unit; and translating the second input into a second operation to be performed by the electronic device.

Embodiment 11 includes the method of embodiment 10, the method further comprising: determining a new operating mode of the multi-input interface device; determining a third input received at least one of the at least one base unit or the at least one auxiliary unit; and translating the third input into a third operation to be performed by the electronic device based at least partially on the new operating mode.

Embodiment 12 includes the method of embodiment 11, wherein the new operating mode defines the at least one base unit and the at least one auxiliary unit operating as a single unit.

Embodiment 13 includes the method of embodiment 10, wherein the first interaction comprises one or more of translational movement of the at least one base unit, rotation of the at least one base unit about a first axis, and actuation of an input device of the at least one base unit; and the second interaction comprises one or more of translational movement of the at least one auxiliary unit, rotation of the at least one auxiliary unit about a second axis, and actuation of an input device of the at least one auxiliary unit.

Embodiment 14 includes the method of embodiment 10, wherein the electronic device comprises a computer system; and the first operation and the second operation cause a change in objects displayed on a display of the computer system.

Embodiment 15 includes the method of embodiment 14, wherein the first operation is movement of a cursor at a first rate, and the second operation is movement of the cursor at a second rate.

Embodiment 16 includes the method of embodiment 10, wherein the electronic device comprises one or more of a real-world vehicles, a virtual vehicle, and a simulated vehicle; and the first operation and the second operation cause control actions in the one or more of the real-world vehicle, the virtual vehicle, and the simulated vehicle.

Embodiment 17 includes a tangible, non-transitory computer-readable medium storing instructions that, when executed by one or more processors of a computing device, cause the computing device to determine an operating mode of a multi-input interface device comprising at least one base unit and at least one auxiliary unit, wherein the operating mode defines input received from the at least one base unit and the at least one auxiliary unit, and determine a base unit input received at the at least one base unit caused by a base unit interaction of a user with the at least one base unit. The instructions, when executed by one or more processors of a computing device, cause the computing device to: translate the base unit input into a first operation to be performed by an electronic device; determine an auxiliary unit input receive at the at least one auxiliary unit caused by an auxiliary unit interaction of the user with the at least one auxiliary unit; and translate the auxiliary unit input into a second operation to be performed by the electronic device.

Embodiment 18 includes the tangible, non-transitory computer-readable medium of embodiment 17, wherein the instructions, when executed by the one or more processors, cause the computer device to determine a new operating mode of the multi-input interface device, the new operating mode defining the at least one base unit and the at least one auxiliary unit operating as a single unit; determine a new input received at least one of the at least one base unit or the at least one auxiliary unit; and translate the new input into a new operation to be performed by the electronic device.

Embodiment 19 includes the tangible, non-transitory computer-readable medium of embodiment 17, wherein: the base unit interaction comprises one or more of translational movement of the at least one base unit, rotation of the at least one base unit about a first axis, and actuation of an input device of the at least one base unit; and the auxiliary unit interaction comprises one or more of translational movement of the at least one auxiliary unit in the plane, rotation of the at least one auxiliary unit about a second axis, and actuation of an input device of the at least one auxiliary unit.

Embodiment 20 includes the tangible, non-transitory computer-readable medium of embodiment 17, wherein the first operation and the second operation cause a change in objects displayed on a display of the computer device.

The following considerations also apply to the foregoing discussion. Throughout this specification, plural instances can implement operations or structures described as a single instance. Although individual operations of one or more methods are illustrated and described as separate operations, one or more of the individual operations can be performed concurrently, and nothing requires that the operations be performed in the order illustrated. These and other variations, modifications, additions, and improvements fall within the scope of the subject matter herein.

"About" as used herein when referring to a measurable value such as an amount, a temporal duration, a measurement, and the like, is meant to encompass variations of ±20%, ±10%, ±5%, ±1%, or ±0.1% from the specified value, as such variations are appropriate or government by manufacturing tolerances.

Unless specifically stated otherwise, discussions herein using words such as "processing," "computing," "calculating," "determining," "presenting," "displaying," or the like can refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or.

In addition, use of "a" or "an" is employed to describe elements and components of the embodiments herein. This is done merely for convenience and to give a general sense of the invention. This description should be read to include one or at least one and the singular also can include the plural unless it is obvious that it is meant otherwise.

Upon reading this disclosure, those of skill in the art will appreciate still additional alternative structural and functional designs for providing feedback to owners of properties, through the principles disclosed herein. Therefore, while particular embodiments and applications have been illustrated and described, it is to be understood that the disclosed embodiments are not limited to the precise construction and components disclosed herein. Various modifications, changes, and variations, which will be apparent to those skilled in the art, can be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality and improve the functioning of conventional computers.

What is claimed:

1. A multi-input interface device, comprising:
   a unit comprising:
      a sensor unit positioned within a portion of the unit and configured to detect a first relative movement of the unit; and
   a single auxiliary unit comprising:
      an auxiliary sensor unit positioned within a portion of the single auxiliary unit and configured to detect a second relative movement of the single auxiliary unit,
   wherein:
      the unit and the single auxiliary unit are formed as separate units, and the unit and the single auxiliary unit are configured to be operated by a user,
      the unit comprises a base housing configured to house the sensor unit, wherein the base housing is structured to allow control by a first portion of the user,
      the single auxiliary unit comprises an auxiliary housing configured to house the auxiliary sensor unit, wherein the auxiliary housing is structured to allow control by a second portion of the user, and
      at least two auxiliary input devices formed in the auxiliary housing, wherein each of the at least two auxiliary input devices is configured for mechanical actuation by the second portion of the user.

2. The multi-input interface device of claim 1, wherein the first portion of the user is different from the second portion of the user.

3. The multi-input interface device of claim 1, wherein:
the unit comprises an input device; and
the at least two auxiliary input devices of the single auxiliary unit form a portion of a top surface of the auxiliary housing.

4. The multi-input interface device of claim 1, wherein:
the sensor unit is configured to detect one or more of translation movement of the unit and rotational movement of the unit; and
the auxiliary sensor unit is configured to detect one or more of translation movement of the single auxiliary unit and rotational movement of the single auxiliary unit.

5. The multi-input interface device of claim 1, further comprising:
a connector bar configured to be coupled to the unit and the single auxiliary unit.

6. The multi-input interface device of claim 5, wherein the connector bar is formed of a rigid material and causes the unit and the single auxiliary unit to operate as a single unit.

7. The multi-input interface device of claim 5, wherein the connector bar is formed of a semi-rigid, elastic material that limits movement of the unit and the single auxiliary unit relative to one another.

8. The multi-input interface device of claim 7, further comprising:
a connector bar sensor unit configured to measure physical properties of the connector bar during the movement of the unit and the single auxiliary unit relative to one another.

9. A method for detecting input, the method comprising:
determining an operating mode of a multi-input interface device comprising a base unit and a single auxiliary unit, wherein:
the operating mode defines input received from the base unit and the single auxiliary unit,
the base unit and the single auxiliary unit are separate units, and
at least two auxiliary input devices are formed in an auxiliary housing of the single auxiliary unit, wherein each of the at least two auxiliary input devices is configured for mechanical actuation by a user;
determining a first input received at the base unit caused by a first interaction of the user with the base unit;
translating the first input into a first operation to be performed by an electronic device;
determining a second input received at the single auxiliary unit caused by a second interaction of the user with the single auxiliary unit; and
translating the second input into a second operation to be performed by the electronic device.

10. The method of claim 9, the method further comprising:
determining a new operating mode of the multi-input interface device;
determining a third input received at at least one of the base unit or the single auxiliary unit; and
translating the third input into a third operation to be performed by the electronic device based at least partially on the new operating mode.

11. The method of claim 10, wherein the new operating mode defines the base unit and the single auxiliary unit operating as a single unit.

12. The method of claim 9, wherein:
the first interaction comprises one or more of translational movement of the base unit, rotation of the base unit about a first axis, and actuation of an input device of the base unit; and
the second interaction comprises one or more of translational movement of the single auxiliary unit, rotation of the single auxiliary unit about a second axis, and actuation of one of the at least two auxiliary input devices.

13. The method of claim 9, wherein:
the electronic device comprises a computer system; and
the first operation and the second operation cause a change in objects displayed on a display of the computer system.

14. The method of claim 13, wherein the first operation is movement of a cursor at a first rate, and the second operation is movement of the cursor at a second rate.

15. The method of claim 9, wherein:
the electronic device comprises one or more of a real-world vehicle, a virtual vehicle, and a simulated vehicle; and
the first operation and the second operation cause control actions in the one or more of the real-world vehicle, the virtual vehicle, and the simulated vehicle.

16. A tangible, non-transitory computer-readable medium storing instructions that, when executed by one or more processors of a computing device, cause the computing device to:
determine an operating mode of a multi-input interface device comprising a base unit and a singled auxiliary unit, wherein:
the operating mode defines input received from the base unit and the single auxiliary unit,
the base unit and the single auxiliary unit are separate units, and
at least two auxiliary input devices are formed in an auxiliary housing of the single auxiliary unit, wherein each of the at least two auxiliary input devices is configured for mechanical actuation by a user;
determine a base unit input received at the base unit caused by a base unit interaction of the user with the base unit;
translate the base unit input into a first operation to be performed by an electronic device;
determine an auxiliary unit input received at the single auxiliary unit caused by an auxiliary unit interaction of the user with the single auxiliary unit; and
translate the auxiliary unit input into a second operation to be performed by the electronic device.

17. The tangible, non-transitory computer-readable medium of claim 16, wherein the instructions, when executed by the one or more processors, cause the computer device to:
determine a new operating mode of the multi-input interface device, the new operating mode defining the base unit and the single auxiliary unit operating as a single unit;
determine a new input received at at least one of the base unit or the single auxiliary unit; and
translate the new input into a new operation to be performed by the electronic device.

18. The tangible, non-transitory computer-readable medium of claim 16, wherein:
- the base unit interaction comprises one or more of translational movement of the base unit, rotation of the base unit about a first axis, and actuation of an input device of the base unit; and
- the auxiliary unit interaction comprises one or more of translational movement of the single auxiliary unit in the plane, rotation of the single auxiliary unit about a second axis, and actuation of one of the at least two auxiliary input devices.

19. The tangible, non-transitory computer-readable medium of claim 16, wherein the first operation and the second operation cause a change in objects displayed on a display of the computer device.

\* \* \* \* \*